（12） United States Patent
Chen et al.

(10) Patent No.: US 12,093,678 B2
(45) Date of Patent: Sep. 17, 2024

(54) OPERATING SYSTEM MANAGEMENT METHOD, DEVICE, STORAGE MEDIUM, AND COMPUTER PROGRAM PRODUCT

(71) Applicant: Honor Device Co., Ltd., Shenzhen (CN)

(72) Inventors: Chao Chen, Shenzhen (CN); Yanzhao Wang, Shenzhen (CN); Zenghui Zhang, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 0 days.

(21) Appl. No.: 17/921,782

(22) PCT Filed: Jun. 15, 2022

(86) PCT No.: PCT/CN2022/098832
§ 371 (c)(1),
(2) Date: Oct. 27, 2022

(87) PCT Pub. No.: WO2022/262748
PCT Pub. Date: Dec. 22, 2022

(65) Prior Publication Data
US 2024/0231789 A1 Jul. 11, 2024

(30) Foreign Application Priority Data

Jun. 15, 2021 (CN) .......................... 202110662950.0

(51) Int. Cl.
*G06F 9/44* (2018.01)
*G06F 8/65* (2018.01)
(52) U.S. Cl.
CPC ...................................... *G06F 8/65* (2013.01)
(58) Field of Classification Search
None
See application file for complete search history.

(56) References Cited

U.S. PATENT DOCUMENTS 9,569,622 B2 * 2/2017 Dover ................... G06F 9/4406
11,507,175 B2 * 11/2022 Golov ................... G06F 9/4418
(Continued)

FOREIGN PATENT DOCUMENTS

CN 107168734 A 9/2017
CN 107273160 A 10/2017
(Continued)

OTHER PUBLICATIONS

"Android10 Dynamic Partition Introduction"; Retrieved on Nov. 15, 2022, URL:https://blog.csdn.net/u012932409/article/details/105075851, English Translation, 28 Pages.
(Continued)

*Primary Examiner* — Qamrun Nahar
(74) *Attorney, Agent, or Firm* — Slater Matsil, LLP

(57) ABSTRACT

Embodiments of this application provide an operating system management method, a device, and a storage medium. The method includes: loading data in a basic partition, a first static partition, and a dynamic partition to run a first operating system; upgrading data in a second static partition; restarting the electronic device, and determining that a current startup sequence is starting from the second static partition; and loading data in the basic partition, the second static partition, and the dynamic partition to run a second operating system. After the restarting the electronic device, and determining that a current startup sequence is starting from the second static partition, the method further includes: synchronizing the data in the second static partition to the first static partition. When an error occurs in a currently loaded static partition, data of another static partition may be used for recovery.

20 Claims, 13 Drawing Sheets

FIG. 3B

(56) References Cited

U.S. PATENT DOCUMENTS

| | | | | |
|---|---|---|---|---|
| 2012/0291021 | A1* | 11/2012 | Banerjee | G06F 9/45558 |
| | | | | 717/173 |
| 2014/0229724 | A1* | 8/2014 | Chen | G06F 9/441 |
| | | | | 713/2 |
| 2020/0089616 | A1* | 3/2020 | Geng | G06F 9/44573 |

FOREIGN PATENT DOCUMENTS

| | | |
|---|---|---|
| CN | 109032846 A | 12/2018 |
| CN | 109408153 A | 3/2019 |
| CN | 109885325 A | 6/2019 |
| CN | 109992450 A | 7/2019 |
| CN | 110543321 A | 12/2019 |
| CN | 111694589 A | 9/2020 |
| CN | 112416359 A | 2/2021 |
| CN | 113821263 A | 12/2021 |

OTHER PUBLICATIONS

Yunchuang, "Virtual A/B Overview", Retrieved on Nov. 15, 2022, URL:https://blog.csdn.net/enweitech/article/details/112286878, English Translation, 10 Pages.

Pyjetson, "Pyjetson;"Virtual AB system, Retrieved from the internet, URL:https://www.cnblogs.com/pyje on Sep. 1, 2023, 6 Pages.

* cited by examiner

OPERATING SYSTEM MANAGEMENT METHOD, DEVICE, STORAGE MEDIUM, AND COMPUTER PROGRAM PRODUCT

CROSS-REFERENCE TO RELATED APPLICATIONS

This application is a National Stage of International Application No. PCT/CN2022/098832, filed on Jun. 15, 2022, which claims priority to Chinese Patent Application No. 202110662950.0, filed on Jun. 15, 2021, both of which are hereby incorporated by reference in their entireties.

TECHNICAL FIELD

This application relates to the field of computer technologies, and specifically, to an operating system management method, a device, a storage medium, and a computer program product.

BACKGROUND

In an application scenario in the conventional technology, a user terminal can be used by a user only after an operating system is installed on the user terminal. For example, a mobile phone can be used by a user only after a mobile phone operating system (such as an iOS system or an Android system) is installed on the mobile phone.

In a process of using a terminal device on which an operating system is installed, there is a case in which the device runs incorrectly or even cannot be started due to an operating system data error. Therefore, a method for coping with the operating system data error is required.

SUMMARY

In view of this, this application provides an operating system management method, a device, a storage medium, and a computer program product, to help resolve a problem that recovery for an operating system data error fails in the conventional technology.

According to a first aspect, an embodiment of this application provides an operating system management method, applied to an electronic device. The electronic device includes a processor and a memory, the memory includes a basic partition, a first static partition, a second static partition, a dynamic partition, and a user data partition, and the method includes:
  loading data in the basic partition, the first static partition, and the dynamic partition to run a first operating system;
  upgrading data in the second static partition;
  restarting the electronic device, and determining that a current startup sequence is starting from the second static partition; and
  loading data in the basic partition, the second static partition, and the dynamic partition to run a second operating system.

After the restarting the electronic device, and determining that a current startup sequence is starting from the second static partition, the method further includes:
  synchronizing the data in the second static partition to the first static partition.

In an implementation of the first aspect, the synchronizing the data in the second static partition to the first static partition includes:
  reading data in each sub-partition of the second static partition; and
  overwriting the data in each sub-partition of the second static partition into a corresponding sub-partition of the first static partition.

In an implementation of the first aspect, the synchronizing the data in the second static partition to the first static partition includes:
  calculating a hash value of data in a third sub-partition, where the third sub-partition is a sub-partition of the second static partition;
  calculating a hash value of data in a fourth sub-partition, where the fourth sub-partition is a sub-partition of the first static partition, and the fourth sub-partition corresponds to the third sub-partition; and
  overwriting the data in the third sub-partition into the fourth sub-partition when the hash value of the data in the third sub-partition is inconsistent with the hash value of the data in the fourth sub-partition.

In an implementation of the first aspect, in a process of loading the data in the basic partition, the second static partition, and the dynamic partition to run the second operating system, the data in the second static partition is synchronized to the first static partition after verification on the data in the second static partition succeeds.

In an implementation of the first aspect, in a process of loading the data in the basic partition, the second static partition, and the dynamic partition to run the second operating system, the data in the second static partition is synchronized to the first static partition after verification on a to-be-loaded dynamic partition file succeeds.

In an implementation of the first aspect,
  before the restarting the electronic device, and determining that a current startup sequence is starting from the second static partition, the method further includes: creating a virtual dynamic partition in the user data partition, and storing first update data in the virtual dynamic partition, where the first update data is used to update data in the dynamic partition.

The loading data in the basic partition, the second static partition, and the dynamic partition to run a second operating system includes: loading the data in the dynamic partition and the first update data.

After the loading data in the basic partition, the second static partition, and the dynamic partition to run a second operating system, the method further includes: merging the first update data into the dynamic partition.

The data in the second static partition is synchronized to the first static partition after the first update data is merged into the dynamic partition.

In an implementation of the first aspect,
  the creating a virtual dynamic partition in the user data partition, and storing first update data in the virtual dynamic partition includes: storing the first update data in the user data partition in a form of a COW file; and
  the loading the data in the dynamic partition and the first update data includes: loading, based on a snapshot technology, a file that needs to be loaded in the COW file of the first update data and the dynamic partition.

In an implementation of the first aspect, the merging the first update data into the dynamic partition includes:
  overwriting the first update data into a to-be-upgraded file corresponding to the first update data in the dynamic partition; and
  deleting the first update data in the user data partition.

According to a second aspect, this application provides an electronic device. The electronic device includes a processor and a memory. The memory includes a basic partition, a first static partition, a second static partition, a dynamic partition, and a user data partition. The dynamic partition includes a plurality of sub-partitions. The processor is configured to execute software code stored in the memory, to enable the electronic device to load data in the basic partition, the first static partition, and the dynamic partition after startup to run a first operating system.

In addition, after the first operating system is run, the electronic device is enabled to perform the method procedure according to the first aspect.

According to a third aspect, this application provides a computer-readable storage medium. The computer-readable storage medium stores a computer program, and when the computer program is run on a computer, the computer is enabled to perform the method according to the first aspect.

According to a fourth aspect, this application provides a computer program product. The computer program product includes a computer program, and when the computer program is run on a computer, the computer is enabled to perform the method according to the first aspect.

According to the foregoing technical solutions provided in embodiments of this application, at least the following technical effects may be implemented.

According to the method in embodiments of this application, each of two static partitions of a device may be a backup of the other static partition, so that when an error occurs in a currently loaded static partition, data of the other static partition may be used for recovery. This greatly improves operating system running stability.

BRIEF DESCRIPTION OF THE DRAWINGS

To describe the technical solutions in embodiments of this application more clearly, the following briefly describes the accompanying drawings for describing the embodiments. It is clear that, the accompanying drawings in the following description show merely some embodiments of this application, and a person of ordinary skill in the art may still derive other drawings from these accompanying drawings without creative efforts.

DETAILED DESCRIPTION OF ILLUSTRATIVE EMBODIMENTS

To better understand the technical solutions of this application, the following describes embodiments of this application in detail with reference to the accompanying drawings.

It should be noted that the described embodiments are merely some but not all of embodiments of this application. Based on embodiments of this application, all other embodiments obtained by a person of ordinary skill in the art without creative efforts fall within the protection scope of this application.

Terms used in embodiments of this application are merely for the purpose of describing specific embodiments, but are not intended to limit this application. Terms "a", "the", and "this" in singular forms in embodiments of this application and the appended claims are also intended to include plural forms, unless otherwise stated in the context clearly.

It should be understood that the term "and/or" used in this specification is merely an association relationship for describing associated objects, and indicates that there may be three relationships. For example, A and/or B may indicate the following three cases: Only A exists, both A and B exist, and only B exists. In addition, the character "/" in this specification usually indicates an "or" relationship between the associated objects.

For a problem that a device runs incorrectly or even cannot be started due to an operating system data error, a feasible solution is to construct operating system backup data on the device. When the operating system data error occurs, the backup data can be used for rollback to a state existing before the operating system error occurs. However, the backup data occupies storage space. This compresses data space that can be freely used by a user, and causes a waste of storage space.

Figure 1:
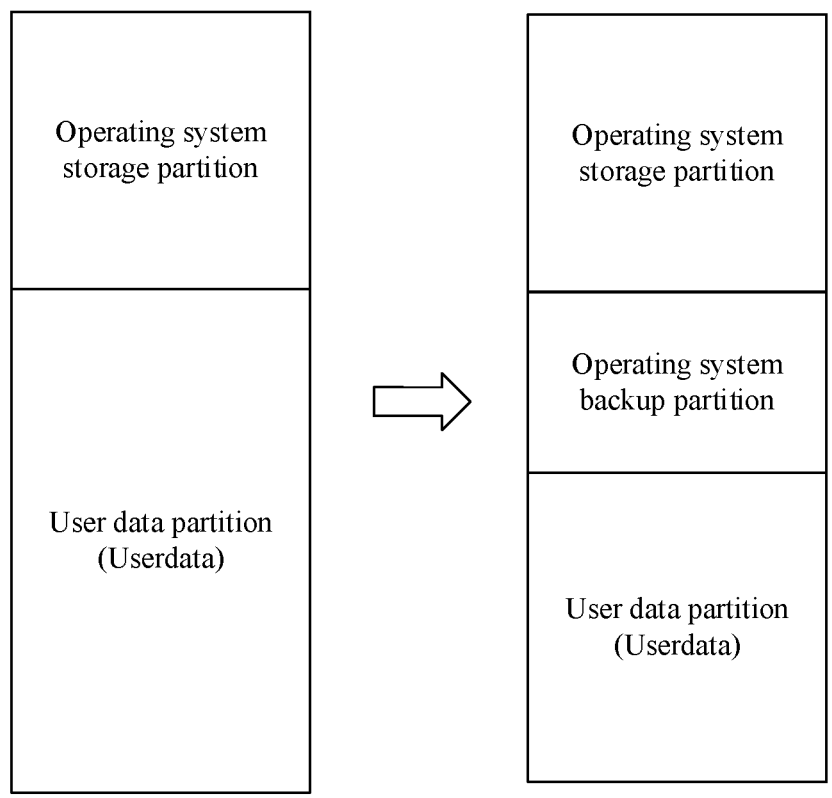
FIG. 1 is a schematic diagram of a data storage structure for operating system backup on a terminal device.

For example, FIG. 1 is a schematic diagram of a data storage structure for operating system backup on a terminal device. As shown in the left part in FIG. 1, before operating system data is backed up, a memory of the device includes two parts: an operating system storage partition and a user data partition (Userdata). Userdata is used to store personal data of a user, for example, an app installed by the user, and a picture, a document, and a video stored by the user. The operating system storage partition is used to store the operating system data. In a process in which the device starts and runs an operating system, the device loads the operating system data in the operating system storage partition.

As shown in the left part in FIG. 1, after the operating system data is backed up, the memory of the device includes three parts: an operating system storage partition, an operating system backup partition, and a user data partition (Userdata). The operating system backup partition is used to store backup data of the operating system data in the operating system storage partition. The operating system backup partition is essentially a part of the user data partition (Userdata). Therefore, storage space that can be freely used by the user is compressed.

To resolve the foregoing problem, in this application, a data storage structure of an operating system is parsed, and data backup is implemented by using original operating system storage space. In this way, when an operating system data error occurs, it is ensured that a device can run normally and start smoothly without compressing data space that can be freely used by a user.

Figure 2:
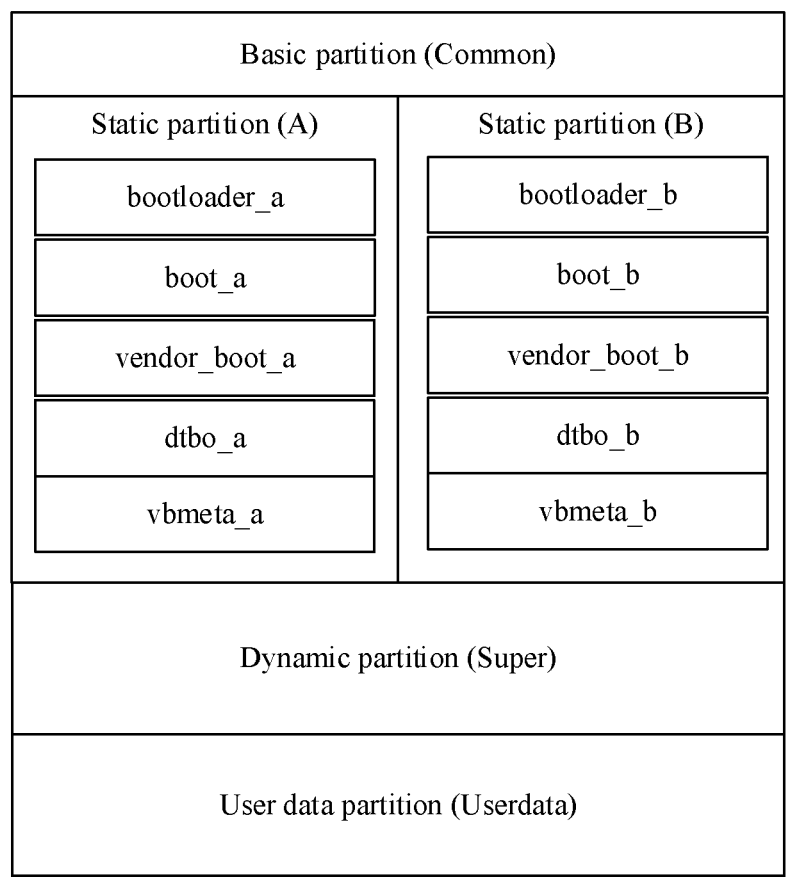
FIG. 2 is a schematic diagram of a data storage structure according to an embodiment of this application.

Specifically, an Android system using a virtual A/B upgrade manner is used as an example. FIG. 2 is a schematic diagram of a data storage structure of the Android system on a terminal device. As shown in FIG. 2, a data storage area of the Android system includes a basic partition (Common), a static partition (A) (first static partition), a static partition (B) (second static partition), a dynamic partition (Super), and a user data partition (Userdata).

The user data partition (Userdata) is used to store personal data of a user, for example, an app installed by the user, and a picture, a document, and a video stored by the user. Data stored in the basic partition is system data that is not related to operating system upgrade. A structure of the static partition (A) corresponds to a structure of the static partition (B), and sub-partition names are distinguished from each other by using suffixes _a and _b. The static partition (A) includes bootloader_a, boot_a, vendor_boot_a, dtbo_a, and vbmeta_a. The static partition (B) includes bootloader_b, boot_b, vendor_boot_b, dtbo_b, and vbmeta_b. The dynamic partition (Super) includes a plurality of sub-partitions.

When the device starts, the device starts from a static partition. For example, the device starts from the static partition (A), and sequentially loads the basic partition (Common), the static partition (A), and the dynamic partition (Super); or the device starts from the static partition (B), and sequentially loads the basic partition (Common), the static partition (B), and the dynamic partition (Super).

In the data storage structure shown in FIG. 2, partition structures of the static partition (A) and the static partition (B) are consistent. In addition, when an operating system is run, only one static partition needs to be read. In theory, when one static partition is unavailable, another static partition may be used to maintain normal running of the operating system. However, in an actual application scenario, data in the static partition (A) is inconsistent with data in the static partition (B), and the data cannot be replaced with each other.

Figure 3A:
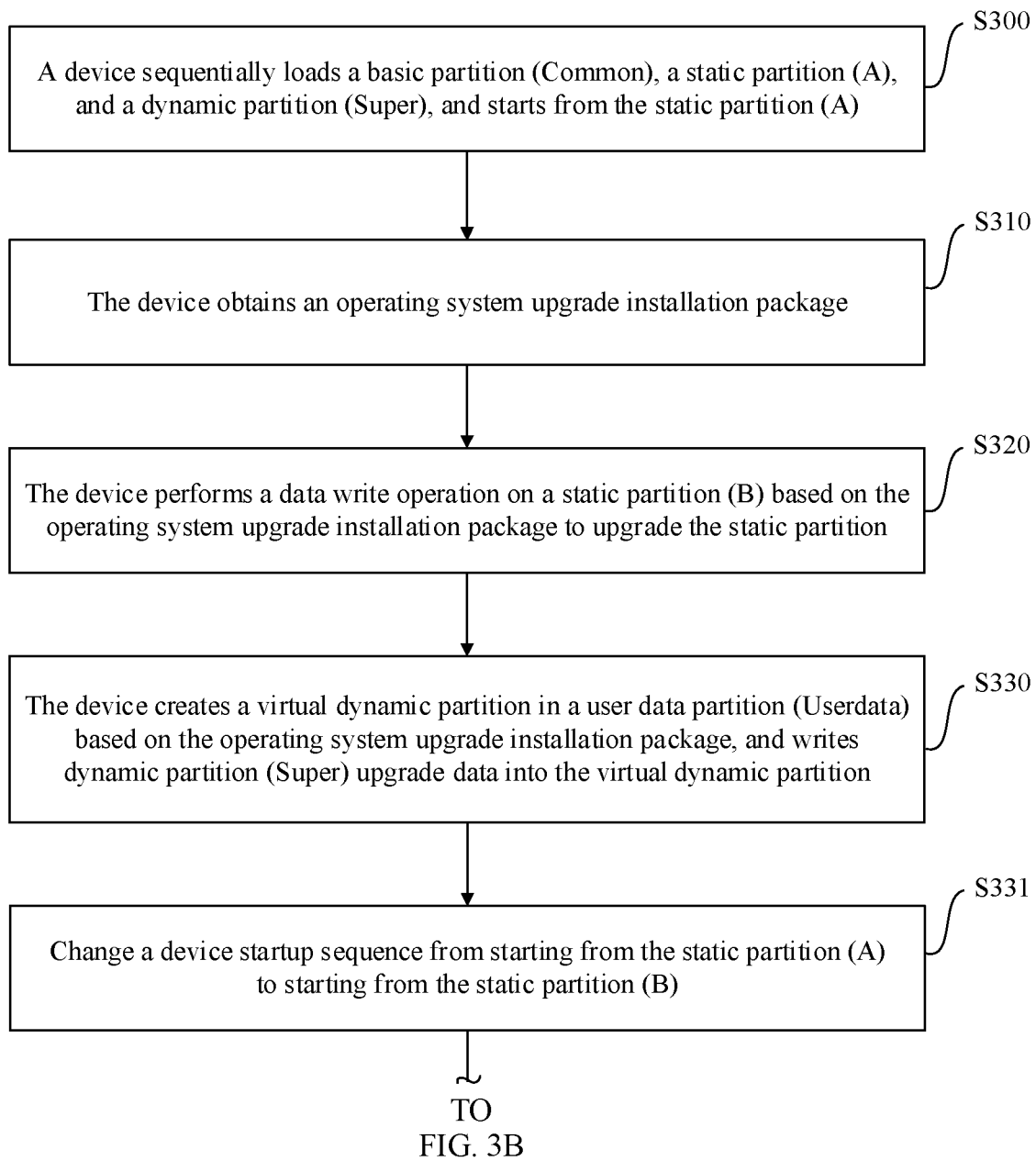
FIG. 3A and FIG. 3B are a flowchart of operating system upgrade according to an embodiment of this application.
Figure 3B:
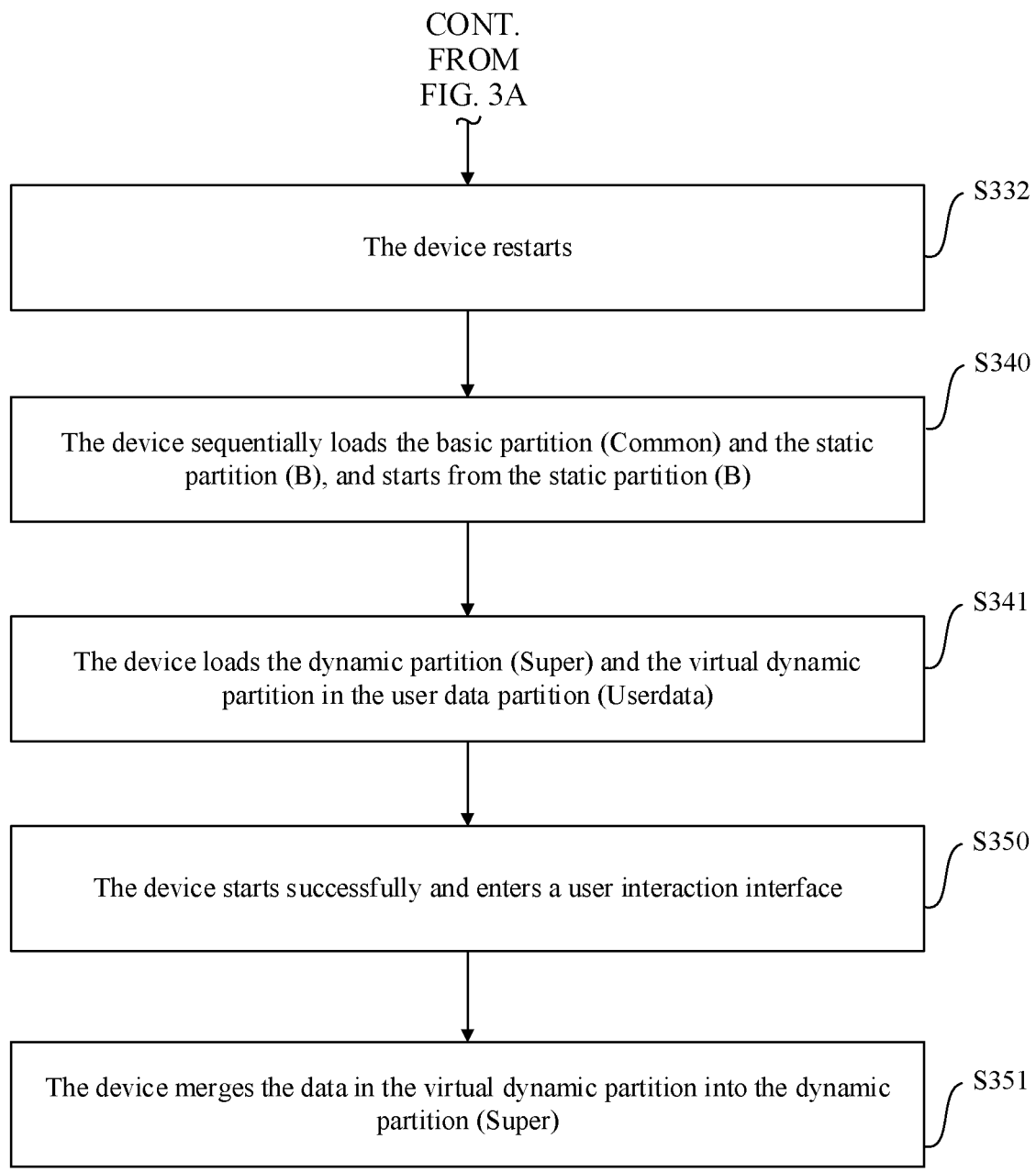

FIG. 3A and FIG. 3B are a flowchart of operating system upgrade for the system storage structure shown in FIG. 2. When the device currently starts from the static partition (A), the device upgrades the operating system according to a procedure shown in FIG. 3A and FIG. 3B.

S300: The device sequentially loads the basic partition (Common), the static partition (A), and the dynamic partition (Super), and starts from the static partition (A), (to run a first operating system).

S310: The device obtains an operating system upgrade installation package.

For example, in a feasible implementation, the device periodically initiates a package search request to a package search server, where the package search request includes a version number (for example, version 1.1) of an operating system currently run on the device; the package search server retrieves, based on the operating system version number in the package search request, whether there is currently an operating system installation package with an updated version number (for example, version 1.2); when there is an operating system installation package with an updated version, the package search server feeds back a download address of the operating system upgrade installation package (for example, an operating system upgrade package for upgrade from the version 1.1 to the version 1.2) to the device; and the device downloads the operating system upgrade installation package based on the download address of the operating system upgrade installation package, and stores the operating system upgrade installation package in the user data partition (Userdata).

S320: The device reads the operating system upgrade installation package stored in S310 from the user data partition (Userdata), and performs a data write operation on the static partition (B) based on the operating system upgrade installation package to upgrade the static partition.

For example, the operating system upgrade installation package includes data of a static partition with the version 1.2, and the device overwrites the data of the static partition with the version 1.2 into the static partition (B).

S330: The device creates a virtual dynamic partition in the user data partition (Userdata) based on the operating system upgrade installation package, and writes dynamic partition (Super) upgrade data into the virtual dynamic partition. For example, the operating system upgrade installation package includes data of a dynamic partition with the version 1.2, and the device writes the data of the dynamic partition (Super) with the version 1.2 into the virtual dynamic partition.

Further, in a virtual A/B upgrade solution, an incremental upgrade manner is used for the dynamic partition (Super). During upgrade, the virtual dynamic partition in the user data partition (Userdata) stores not all files of a dynamic partition (Super) with an upgraded new version, but an upgrade result that is of data to be upgraded in the dynamic partition (Super) with an old version and that is obtained after upgrade. In other words, the virtual dynamic partition in the user data partition (Userdata) stores update data of the dynamic partition.

A system sub-partition is used as an example. It is assumed that in the version 1.1, data in the system sub-partition may be divided into two parts: system1 and system2. During upgrade from the version 1.1 to the version 1.2, the data system2 does not change, and the data system1 is upgraded to system3. In this case, in S330, the device creates the virtual dynamic partition in the user data partition (Userdata), and writes the data system3 into the virtual dynamic partition.

For example, the system incremental upgrade installation package for upgrade from the version 1.1 to the version 1.2 includes dynamic partition (Super) update data for upgrade from the version 1.1 to the version 1.2, and the dynamic partition (Super) update data includes the data system3.

Further, in the virtual A/B upgrade solution, incremental upgrade of the dynamic partition (Super) is implemented based on a snapshot (snapshot) technology. Specifically, in the virtual dynamic partition in the user data partition (Userdata), a copy-on-write (Copy-On-Write, COW) file is used to store the dynamic partition (Super) upgrade data.

Specifically, the dynamic partition (Super) upgrade data stored in the user data partition (Userdata) includes a plurality of COW files, each COW file is corresponding to one sub-partition of the dynamic partition (Super), and a name of the COW file is corresponding to the sub-partition of the dynamic partition (Super).

In the operating system upgrade installation package obtained in S310, the COW file in the dynamic partition (Super) upgrade data is compressed and stored in a form of binary code. In the operating system upgrade installation package, each COW file is named based on the sub-partition of the dynamic partition (Super) corresponding to the COW file. For example, a COW file corresponding to the system sub-partition is named system-cow-img.img.0000.

In S330, the device unpacks the operating system upgrade installation package to obtain all COW files, and adds an A/B partition tag to each COW file. Specifically, when the device currently starts from the static partition (A), it may be understood that a dynamic partition (Super) currently loaded by the device to run the operating system is a dynamic partition (A). When the operating system is upgraded, the virtual dynamic partition created in the user data partition (Userdata) is for a dynamic partition (B). Therefore, a name tag_b corresponding to the dynamic partition (B) is added to a COW file. For example, _b is added to system-cow-img.img.0000 to generate system_b-cow-img.img.0000.

Further, in S330, an update folder is created in the user data partition (Userdata), and a renamed COW file is stored in the update folder. For example, in an application scenario, after the COW file is written into the user data partition (Userdata), the update folder in the user data partition (Userdata) includes the following files:
system_b-cow-img.img.0000;
system_ext_b-cow-img.img.0000;
vendor_b-cow-img.img.0000;
product_b-cow-img.img.0000;
cust_b-cow-img.img.0000;
odm_b-cow-img.img.0000.

Specifically, the COW file includes a COW file map (snapshot map) of the COW file and upgrade data.

The COW file map (snapshot) corresponds to a file map of a sub-partition of a dynamic partition (Super) corresponding to the COW file. The file map of the sub-partition of the dynamic partition (Super) is used to describe all files in a sub-partition of a dynamic partition (Super) of an operating system with a current version (version before current upgrade, for example, version 1.1) and a storage address of each file.

The upgrade data in the COW file is an updated file in sub-partition data of a new version compared with sub-partition data of the current version. The COW file map of the COW file is used to describe a correspondence between the updated file and a file in a sub-partition with the current version and a storage address of the updated file.

Based on the file map of the sub-partition of the dynamic partition (Super) and the COW file map of the COW file, the upgrade data in the COW file may be used to replace the corresponding file in the sub-partition of the dynamic partition (Super), to upgrade data in the dynamic partition (Super). Specifically, when the file map of the sub-partition of the dynamic partition (Super) needs to be obtained, a snapshot operation may be performed on the data in the sub-partition of the dynamic partition (Super) based on a snapshot, to generate the file map of the sub-partition of the dynamic partition (Super). Alternatively, when the operating system upgrade installation package is created, the file map of the sub-partition of the dynamic partition (Super) may be generated in advance, and the file map is added to the COW file.

The system sub-partition is used as an example. It is assumed that data is stored in the system sub-partition according to the following paths:
/system/app/A0.XXX;
/system/app/A1.XXX;
/system/app/A2.XXX;
/system/B0.XXX;
/system/B1.XXX;
/system/user/C0.XXX;
/system/user/C1.XXX;
/system/user/C2.XXX;
/system/user/C3.XXX.

A file map of the system sub-partition may be:
/system/app/A0.XXX: 024010~024013;
/system/app/A1.XXX: 024014~024017;
/system/app/A2.XXX: 024018~024020;
/system/B0.XXX: 024021~024026;
/system/B1.XXX: 024027~024028;
/system/user/C0.XXX: 024029~024032;
/system/user/C1.XXX: 024033~024035;
/system/user/C2.XXX: 024036~024040;
/system/user/C3.XXX: 024041~024044.

A value following a file name (for example, 024010~024013 in /system/app/A0.XXX: 024010~024013) is a physical storage address (block address) of the file in the system sub-partition of the dynamic partition (Super).

It is assumed that data/system/app/A2.XXX and data/system/user/C2.XXX need to be updated in current operating system upgrade.

It may be considered that:
/system/app/A2.XXX and/system/user/C2.XXX are a system1 part of the data in the system sub-partition; and
/system/app/A0.XXX, /system/app/A1.XXX, /system/B0.XXX, /system/B1.XXX, /system/user/C0.XXX, /system/user/C1.XXX, and/system/user/C3.XXX are a system2 part of the data in the system sub-partition.

In this case, the COW file (system_b-cow-img.img.0000) corresponding to the system sub-partition includes the latest/system/app/A2.XXX and/system/user/C2.XXX.

It may be considered that the latest/system/app/A2.XXX and/system/user/C2.XXX are system3. An upgrade objective is to use system3 to update system1.

When a size of update data in the COW file is consistent with a size of to-be-updated original data, and a storage location of the update data in the COW file in the sub-partition after data update is consistent with a storage location of the to-be-updated original data in the sub-partition, the COW file map of the COW file (system_b-cow-img.img.0000) may be:
/system/app/A2.XXX:
  Map1 (address of the to-be-updated data in the original super partition): start address (address start): 024018 (offset relative to a system start address); offset size (size): 2 (that is, data of an address segment 024018~024020);
  Map2 (address of the update data stored in the cow file): start address (address start): 045033 (offset relative to a start address stored in the cow file); offset size (size): 2 (that is, data of an address segment 045033~045035);
/system/user/C2.XXX:
  Map1 (address of the to-be-updated data in the original super partition): start address (address start): 024036 (offset relative to a system start address); offset size (size): 4 (that is, data of an address segment 024036~024040);
  Map2 (address of the update data stored in the cow file): start address (address start): 045036 (offset relative to a start address stored in the cow file); offset size (size): 4 (that is, data of an address segment 045036~045040).

When a size of update data in the COW file is inconsistent with a size of to-be-updated original data, the COW file map of the COW file (system_b-cow-img.img.0000) may be:
/system/app/A2.XXX:
  Map1.1 (address of the to-be-updated data in the original super partition): start address (address start): 024018 (offset relative to a system start address); offset size (size): 2 (that is, data of an address segment 024018~024020);
  Map2.1 (address of the update data that is stored in the cow file and that needs to cover the Map1.1 address): start address (address start): 045033 (offset relative to a start address stored in the cow file); offset size (size): 2 (that is, data of an address segment 045033~045035);
  Map1.2 (to-be-written address, in the original super partition, of an excess part of the update data in the cow file relative to the size of the to-be-updated data): start address (address start): 025018 (offset relative to a system start address); offset size (size): 1 (that is, data of an address segment 025018~025020);

Map2.2 (address of the update data that is stored in the cow file and that needs to cover the Map1.2 address): start address (address start): 046033 (offset relative to a start address stored in the cow file); offset size (size): 2 (that is, data of an address segment 046033~046035).

In the following description of the specification, for ease of description, only an application scenario in which the size of the update data in the COW file is consistent with the size of the to-be-updated original data, and the storage location of the update data in the COW file in the sub-partition after data update is consistent with the storage location of the to-be-updated original data in the sub-partition is used as an example for description.

In the foregoing example, address segments (045033~045035 and 045036~045040) are respectively physical storage addresses (block addresses) of the latest/ system/app/A2.XXX and/system/user/C2.XXX in the COW file (system_b-cow-img.img.0000) in the user data partition (Userdata).

In this way, if A2.XXX on the address 045033~045035 is used to replace A2.XXX on the address 024018~024020, and C2.XXX on the address 045036~045040 is used to replace C2.XXX on the address 024036~024040, data upgrade of the system sub-partition of the dynamic partition (Super) can be completed.

Further, in S330, after the COW file is written into the user data partition (Userdata), overall verification further needs to be performed on the dynamic partition (Super) and the COW file, to verify validity of the dynamic partition (Super) and the COW file, and verify whether a combination result of the dynamic partition (Super) data and the COW file of the current version is dynamic partition (Super) data of a new version.

Specifically, upgrade from the version 1.1 to a version 1.3 is used as an example. A hash value of a combination result of data that does not need to be upgraded (data that does not change from the version 1.1 to the version 1.2) in the dynamic partition (Super) and upgrade data (data that needs to be upgraded from the version 1.1 to the version 1.2) in the COW file is calculated, and whether the hash value is consistent with a hash value of complete data in the dynamic partition (Super) with the version 1.3 is determined. If the hash values are consistent, it indicates that the COW file is valid. If the hash values are not consistent, it indicates that the COW file is invalid, the upgrade fails, the upgrade process is interrupted, and an error is reported. The hash value of the complete data in the dynamic partition (Super) with the version 1.3 is stored in the operating system upgrade installation package.

Specifically, in a verification process, the dynamic partition (Super) and the COW file are combined based on a snapshot. In an implementation process based on the snapshot, combination of the dynamic partition (Super) and the COW file is not physical combination, but combining the overall file map of the sub-partition of the COW file and the COW file map of the COW file, to generate a file map of sub-partition data of a new version.

For example, the file map of the system sub-partition is combined with the COW file map. The file map of the system sub-partition is:
/system/app/A0.XXX: 024010~024013;
/system/app/A1.XXX: 024014~024017;
/system/app/A2.XXX: 024018~024020;
/system/B0.XXX: 024021~024026;
/system/B1.XXX: 024027~024028;
/system/user/C0.XXX: 024029~024032;
/system/user/C1.XXX: 024033~024035;
/system/user/C2.XXX: 024036~024040;
/system/user/C3.XXX: 024041~024044.

The COW file map is:
/system/app/A2.XXX:
  Map1: address start: 024018; size: 2 (that is, data of an address segment 024018~024020);
  Map2: address start: 045033; size: 2 (that is, data of an address segment 045033~045035);
/system/user/C2.XXX:
  Map1: address start: 024036; size: 4 (that is, data of an address segment 024036~024040);
  Map2: address start: 045036; size: 4 (that is, data of an address segment 045036~045040).

In this case, a new-version file map of the system sub-partition is obtained:
/system/app/A0.XXX: 024010~024013
  (pointing to A0.XXX in/system/app in the dynamic partition (Super));
/system/app/A1.XXX: 024014~024017
  (pointing to A1.XXX in/system/app in the dynamic partition (Super));
/system/app/A2.XXX: 045033~045035
  (pointing to A2.XXX in/Update/system_b-cow-img.img.0000 in the user data partition (Userdata));
/system/B0.XXX: 024021~024026
  (pointing to B0.XXX in/system in the dynamic partition (Super));
/system/B1.XXX: 024027~024028
  (pointing to B1.XXX in/system in the dynamic partition (Super));
/system/user/C0.XXX: 024029~024032
  (pointing to C0.XXX in/system/user in the dynamic partition (Super));
/system/user/C1.XXX: 024033~024035
  (pointing to C1.XXX in/system/user in the dynamic partition (Super));
/system/user/C2.XXX: 045036~045040
  (pointing to C2.XXX in/Update/system_b-cow-img.img.0000 in the user data partition (Userdata));
/system/user/C3.XXX: 024041~024044
  (pointing to C3.XXX in/system/user in the dynamic partition (Super)).

In the file map of the system sub-partition with the new version, a storage address of /system/app/A2.XXX does not point to/system/app/A2.XXX in the dynamic partition (Super) in a memory, but points to A2.XXX in system_b-cow-img.img.0000 in the user data partition (Userdata) in the memory; and a storage address of/system/user/C2.XXX does not point to /system/user/C2.XXX in the dynamic partition (Super) in the memory, but points to C2.XXX in system_b-cow-img.img.0000 in the user data partition (Userdata) in the memory.

In a verification process, new-version file maps of all sub-partitions of the dynamic partition (Super) are obtained in the foregoing combination manner (if a corresponding COW file of a sub-partition is not written into the user data partition (Userdata), a file map of the sub-partition is directly used as a new-version file map). The new-version file maps of all the sub-partitions are combined to generate a new-version file system of the dynamic partition (Super).

Data is read based on the new-version file system of the dynamic partition (Super), to read all files included in the new-version file system of the dynamic partition (Super) and calculate a hash value.

When the COW file is valid, merging status information in a metadata partition (/metadata) in the basic partition (Common) is changed from "merged (merged)" to "wait for merge (wait for merge)". The merging status information is used to indicate whether there is currently a COW file that needs to be merged into the dynamic partition (Super). Specifically, the merging status information includes an overall identifier for the dynamic partition (Super) and a sub-partition identifier for each sub-partition. When the overall identifier is "merged (merged)", it indicates that a merging operation needs to be performed on none of all the sub-partitions of the dynamic partition (Super). When the overall identifier is "wait for merge (wait for merge)", it indicates that a merging operation needs to be performed on one or more sub-partitions of the dynamic partition (Super). When the sub-partition identifier is "merged (merged)", it indicates that a merging operation does not need to be performed on the sub-partition. When the sub-partition identifier is "wait for merge (wait for merge)", it indicates that a merging operation needs to be performed on the sub-partition.

S331: Change a device startup sequence from starting from the static partition (A) to starting from the static partition (B).

For example, a startup sequence identifier in a master boot record (Master Boot Record, MBR) is rewritten, to rewrite the startup sequence identifier from A to B. After the device is powered on, when the device learns that the startup sequence identifier is A, the device starts from the static partition (A), and loads the static partition (A) during startup; or when the device learns that the startup sequence identifier is B, the device starts from the static partition (B), and loads the static partition (B) during startup.

S332: The device restarts. The current operating system is exited, the device is powered off, and the device is powered on again.

S340: The device sequentially loads the basic partition (Common) and the static partition (B).

For example, the device first loads the basic partition (Common). In a process of loading the basic partition (Common), the device reads a startup identifier in the basic partition (Common). When the startup identifier in the basic partition (Common) is (A), the device loads the static partition (A) after loading the basic partition (Common), to start from the static partition (A). When the startup identifier in the basic partition (Common) is (B), the device loads the static partition (B) after loading the basic partition (Common), to start from the static partition (B).

In S340, the device reads the startup identifier in the basic partition (Common). The startup identifier in the basic partition (Common) is (B). The device loads the static partition (B) after loading the basic partition (Common), and starts from the static partition (B).

S341: The device loads the dynamic partition (Super) and the virtual dynamic partition in the user data partition (Userdata).

Specifically, the device reads the merging status information in the metadata (/metadata), determines, based on the merging status information, whether a COW file needs to be retrieved from a specified path in the user data partition (Userdata), and combines and loads the dynamic partition (Super) and the COW file based on a snapshot.

Further, in S341, the device does not load all COW files in the dynamic partition (Super) and the user data partition (Userdata), but loads a corresponding file based on an operating system running requirement. Specifically, in S341, the device determines, based on the operating system running requirement, a file that needs to be loaded, extracts the corresponding file from COW files in the dynamic partition (Super) or the virtual dynamic partition based on a snapshot, and loads the file.

Specifically, in S341, when the corresponding COW file exists in a sub-partition of the dynamic partition (Super), a new-version file map of each sub-partition of the dynamic partition (Super) is first generated based on the snapshot. For a process of generating the new-version file map, refer to S330. The device determines, based on the operating system running requirement, the file that needs to be loaded, and loads the file based on the new-version file map of the sub-partition of the dynamic partition (Super).

For example, the operating system running requirement is loading all data in a directory user in the system sub-partition (/system/user). The device reads the merging status information in the metadata (/metadata), and the sub-partition identifier of the system sub-partition in the merging status information is "wait for merge (wait for merge)". Therefore, the device searches for a COW file in/Update in the user data partition (Userdata), and after finding the COW file system_b-cow-img.img.0000 in Update, generates the new-version file map of the system sub-partition based on the snapshot and the file map of the COW file in system_b-cow-img.img.0000. Data is loaded based on storage addresses of all files in/system/user in the new-version file map of the system sub-partition, for example, based on the following in the new-version file map of the system sub-partition:

/system/user/C0.XXX: 024029~024032;
/system/user/C1.XXX: 024033~024035;
/system/user/C2.XXX: 045036~045040;
/system/user/C3.XXX: 024041~024044.

C0.XXX at the address 024029~024032, C1.XXX at the address 024033~024035, C2.XXX at the address 045036~045040, and C3.XXX at the address 024041~024044 are loaded.

Further, when all data in the directory user in the system sub-partition (/system/user) is loaded, and the sub-partition identifier of the system sub-partition in the merging status information is "merged (merged)", the device does not search for a COW file in /Update in the user data partition (Userdata), but directly loads all the data in the directory user in the system sub-partition (/system/user).

Further, when all data in the directory user in the system sub-partition (/system/user) is loaded, and the sub-partition identifier of the system sub-partition in the merging status information is "wait for merge (wait for merge)", if the device does not find the COW file corresponding to the system sub-partition in /Update in the user data partition (Userdata), it indicates that a data write error (COW file write error or merging status information write error) occurs in the upgrade process. In this case, the device rolls back the system and reports the error.

Further, in S341, before the file is loaded, the device further needs to verify the to-be-loaded file. Different from S330, in S341, overall verification is not performed on the dynamic partition (Super) and the COW file, but only the file that needs to be loaded is verified. For example, verification is performed based on dmverity (dm-verity is a target (target) of a dm (device mapper), is a virtual block device, and is specially used for file system verification). If the verification succeeds, the file is loaded. If the verification fails, the device is restarted, and the system is rolled back or the file is loaded again.

S350: The device starts successfully and enters a user interaction interface (to run a second operating system).

S351: The device merges the data in the virtual dynamic partition into the dynamic partition (Super) in the background.

In the description of the specification of this application, the merging operation means that in the operating system upgrade process, a dynamic partition (Super) upgrade file (COW file) stored in the virtual dynamic partition in the user data partition (Userdata) is written into the dynamic partition (Super), to complete data upgrade of a file in the dynamic partition (Super), so that the device does not need to load both the dynamic partition (Super) and the virtual dynamic partition during next startup, but needs to load only the dynamic partition (Super) to complete device startup.

Specifically, the device performs power-on broadcast after successful startup, and starts an upgrade process after power-on broadcast. The upgrade process reads the merging status information in the metadata (/metadata) in the basic partition (Common). If the merging status information is "merged (merged)", the device enters a normal running mode.

If the merging status information is "wait for merge (wait for merge)", the upgrade process merges the COW file in the user data partition (Userdata) into the dynamic partition (Super).

Specifically, the upgrade process writes the upgrade data in the COW file in the user data partition (Userdata) into a corresponding address in the dynamic partition (Super), so that all data in the dynamic partition (Super) is data of an upgraded new version.

For example, data at the address 045033~045035 is written into the address 024014~024017 based on/system/app/A2.XXX: 024018~024020 in the file map of the system sub-partition and/system/app/A2.XXX: 045033~045035 in the COW file map; and data at the address 045036~045040 is written into the address 024036~024040 based on /system/user/C2.XXX: 024036~024040 in the file map of the system sub-partition and /system/user/C2.XXX: 045036~045040 in the COW file map.

Then, the upgrade process deletes the COW file in the user data partition (Userdata), and returns storage space to the user data partition (Userdata). In addition, the merging status information in the metadata (/metadata) in the basic partition (Common) is changed from "wait for merge (wait for merge)" to "merged (merged)".

In S320, a data operation of static partition upgrade is for operating system data in the static partition (B), and does not affect operating system data in the currently started static partition (A). In addition, in S330, a data operation of dynamic partition upgrade is completed in the virtual dynamic partition created in the user data partition (Userdata), and does not affect the currently loaded dynamic partition (Super). Therefore, in the entire operating system upgrade process, the user can normally use the device. In addition, after S331 is completed, the device does not need to restart immediately, but the user may autonomously select a restart occasion. In this way, the operating system upgrade process does not affect a normal mobile phone operation of the user. This greatly improves user experience. Further, for the dynamic partition (Super), the virtual dynamic partition is created in the user data partition (Userdata) only when upgrade needs to be performed. Therefore, data storage space utilization is effectively improved.

Based on the foregoing upgrade procedure, it is assumed that the static partition (A) corresponds to the operating system with the version 1.1, and the device starts from the static partition (A) to run the operating system with the version 1.1. When the operating system is upgraded to 1.2, according to the procedure shown in FIG. 2, the static partition (B) is upgraded to the operating system with the version 1.2, and after restarting, the device starts from the static partition (B) to run the operating system with the version 1.2. In this case, the device runs the operating system with the version 1.2. The static partition (A) corresponds to the operating system with the version 1.1, the static partition (B) corresponds to the operating system with the version 1.2, and data in the static partition (A) is inconsistent with data in the static partition (B). If an error occurs in the static partition (B), the static partition (A) cannot replace a function of the static partition (B), and the static partition (A) cannot support the device in running the operating system with the version 1.1. However, if the data in the static partition (A) is always kept consistent with the data in the static partition (B), when an error occurs in the static partition (A) or the static partition (B), the other static partition can be used.

Therefore, an embodiment of this application provides an operating system backup method. Mutual data backup is performed between the static partition (A) and the static partition (B), to keep consistency between the data in the static partition (A) and the data in the static partition (B).

Specifically, in an Android system that uses a virtual A/B upgrade manner, data in a static partition is rewritten only when the operating system is upgraded. Therefore, in the solution of this application, after the operating system is upgraded each time, data in a static partition loaded for running an operating system with a current version is synchronized to a static partition loaded for running an operating system with a previous version.

As shown in FIG. 3A and FIG. 3B, after S351, S360 is performed to synchronize the data in the static partition (B) to the static partition (A).

According to the method in the embodiment shown in FIG. 2, static partition synchronization is performed after the operating system is upgraded each time, to ensure that data in two static partitions is consistent, so that when a data error occurs in one static partition, normal running of the operating system is maintained by using the other static partition.

Further, a specific implementation of S360 is not specifically limited in this application, and a person skilled in the art may implement S360 in a plurality of feasible implementations. The following uses four specific embodiments as examples to describe specific implementation procedures of S360.

In S320, the device writes the data in the static partition in the operating system upgrade installation package into the static partition (B). Therefore, if the same operating system upgrade installation package is used, the data in the static partition in the operating system upgrade installation package is written into the static partition (A), so that the data in the static partition (A) is consistent with the data in the static partition (B).

Therefore, in an embodiment, S360 includes: Read the operating system upgrade installation package stored in S310 from the user data partition (Userdata), and write the data in the static partition in the operating system upgrade installation package into the static partition (A).

In the operating system data storage structure shown in FIG. 1, the static partition (A) is completely consistent with the static partition (B) in terms of partition structure and partition size. Therefore, the data in the static partition (A) may be directly mirrored to the static partition (B), or the data in the static partition (B) may be directly mirrored to the static partition (A).

Figure 4:
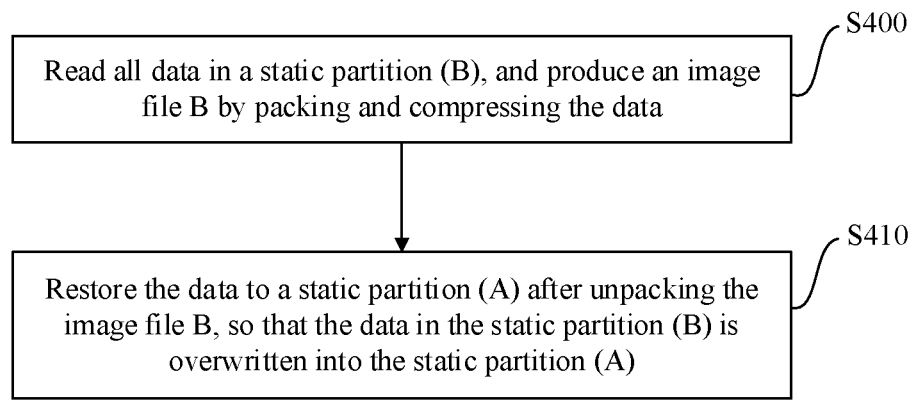
FIG. 4 is a flowchart of static partition synchronization according to an embodiment of this application.

FIG. 4 is a flowchart of an implementation of S360. The terminal device performs the following procedure shown in FIG. 4 to implement S360.

S400: Read all data in the static partition (B), and produce an image file B by packing and compressing the data.

S410: Restore the data to the static partition (A) after unpacking the image file B, so that the data in the static partition (B) is overwritten into the static partition (A).

In a possible implementation, in the operating system data storage structure shown in FIG. 2, the static partition (A) and the static partition (B) are consistent in terms of partition structure, and include a same sub-partition. Therefore, the data in the static partition (B) can be synchronized to the static partition (A) by overwriting a file in each sub-partition in the static partition (B) into a corresponding sub-partition in the static partition (A).

Figure 5A:
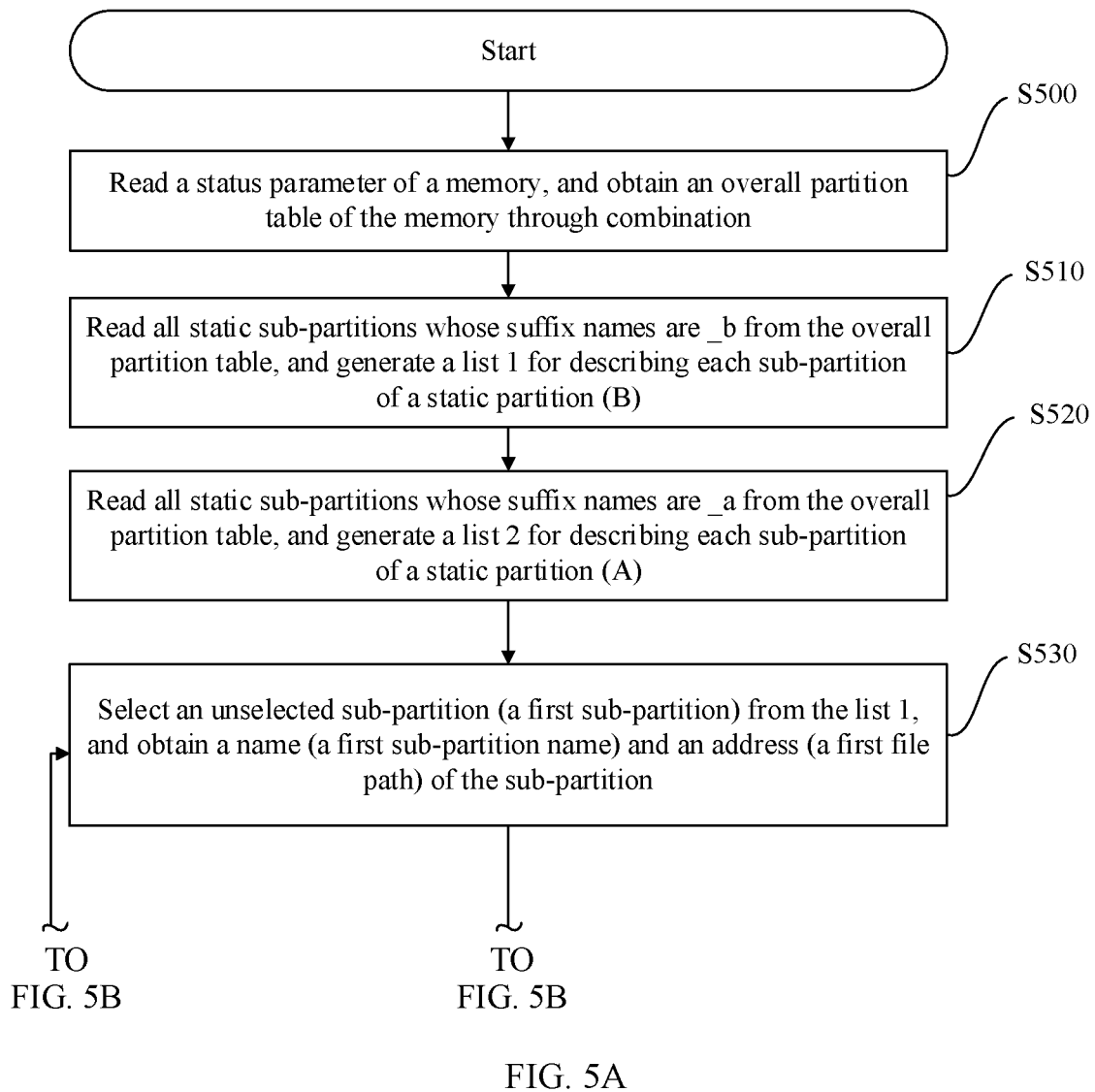
FIG. 5A and FIG. 5B are a flowchart of static partition synchronization according to an embodiment of this application.
Figure 5B:
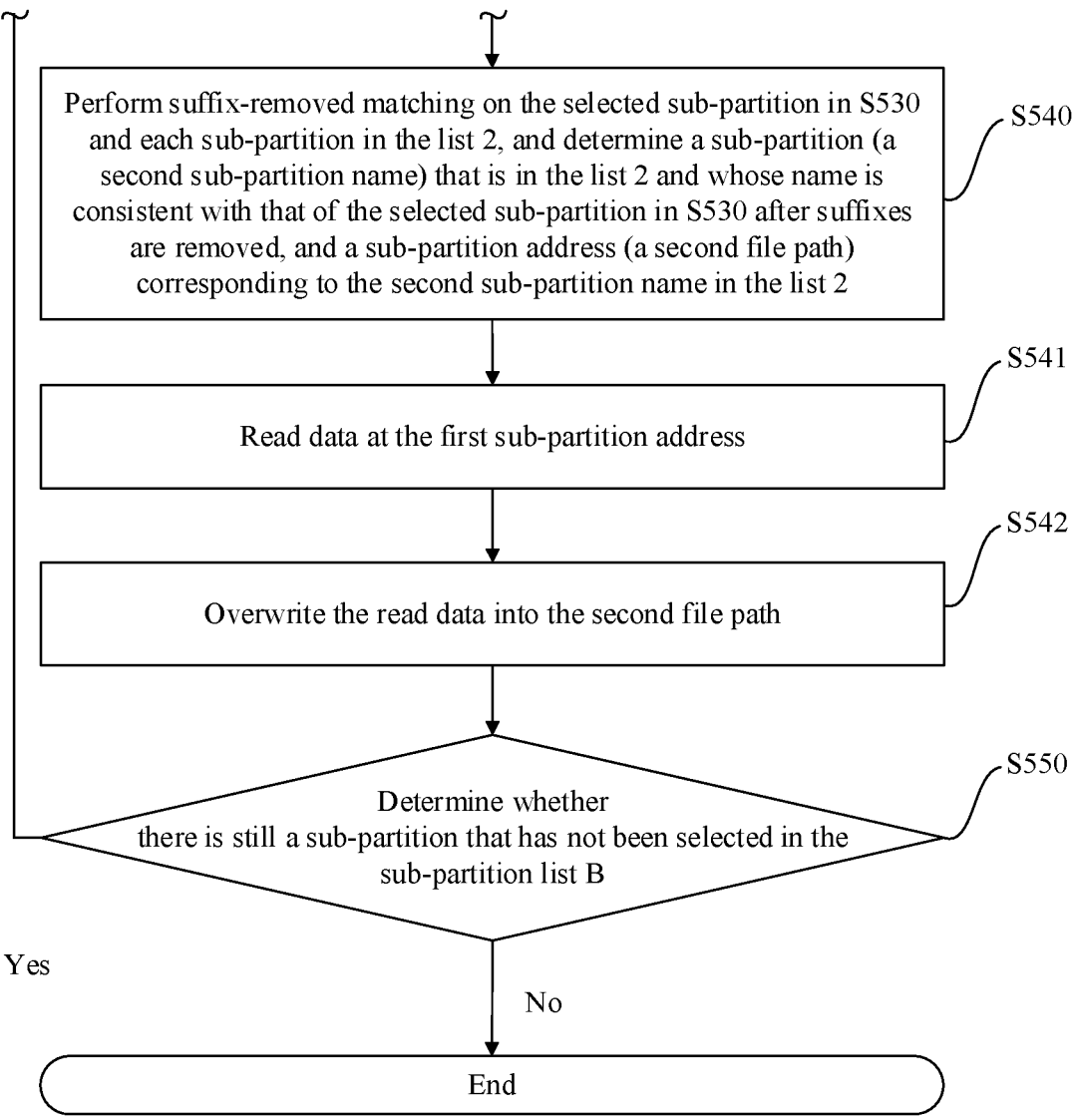

FIG. 5A and FIG. 5B are a flowchart of an implementation of S360. The terminal device performs the following procedure shown in FIG. 5A and FIG. 5B to implement S360.

S500: Read description data that is in a memory of the device and that is related to a partition table (the parameter is pre-stored in the device before delivery of the device), and obtain an overall partition table of the memory through combination.

A universal flash storage (Universal Flash Storage, UFS) in a master boot record (Master Boot Record, MBR) format is used as an example. Size information and location information of each partition in the UFS are read from an MBR (which is a master boot sector and the first sector of the UFS, that is, 0-cylinder 0-head 1-sector of a C/H/S address) of the UFS, to obtain a partition table (Dpt).

S510: Read all static sub-partitions whose suffix names are _b from the overall partition table, and generate a list 1 for describing each sub-partition of the static partition (B), where the list 1 includes a name and an address of each sub-partition of the static partition (B). An example is as follows:

TABLE 1

| Number | Sub-partition name | Sub-partition address (file path) | Selected state |
|---|---|---|---|
| 1 | bootloader_b | /dev/block/by-name/bootloader_b | 0 |
| 2 | boot_b | /dev/block/by-name/boot_b | 0 |
| 3 | vendor boot_b | /dev/block/by-name/vendor boot_b | 0 |
| 4 | dtbo_b | /dev/block/by-name/dtbo_b | 0 |
| 5 | vbmeta_b | /dev/block/by-name/vbmeta_b | 0 |

S520: Read all static sub-partitions whose suffix names are _a from the overall partition table, and generate a list 2 for describing each sub-partition of the static partition (A), where the list 2 includes a name and an address of each sub-partition of the static partition (A). An example is as follows:

TABLE 2

| Number | Sub-partition name | Sub-partition address (file path) |
|---|---|---|
| 1 | bootloader_a | /dev/block/by-name/bootloader_a |
| 2 | boot_a | /dev/block/by-name/boot_a |
| 3 | vendor boot_a | /dev/block/by-name/vendor boot_a |

TABLE 2-continued

| Number | Sub-partition name | Sub-partition address (file path) |
|---|---|---|
| 4 | dtbo_a | /dev/block/by-name/dtbo_a |
| 5 | vbmeta_a | /dev/block/by-name/vbmeta_a |

It should be noted herein that, in Table 1 and Table 2, the address of the sub-partition is represented in a file path manner. In an actual application scenario, a person skilled in the art may describe the address of the sub-partition in a plurality of different manners. For example, a linear address is used for description.

S530: Select an unselected sub-partition (a first sub-partition) from the list 1, and obtain a name (a first sub-partition name) and an address (a first file path) of the sub-partition.

Specifically, before S530, none of sub-partitions in the list 1 is selected. In S530, sub-partitions may be sequentially selected based on an arrangement sequence (number sequence) of the sub-partitions in the list 1, or may be randomly selected from all unselected sub-partitions.

Further, after a sub-partition is selected, the sub-partition is marked to subsequently determine whether the sub-partition has been selected. For example, as shown in Table 1, a selected state column is added to Table 1, and an initial value of the selected state is 0. If the sub-partition is selected, the selected state is changed to 1.

S540: Perform suffix-removed matching on the selected sub-partition in S530 and each sub-partition in the list 2, and determine a sub-partition (a second sub-partition name) that is in the list 2 and whose name is consistent with that of the selected sub-partition in S530 after suffixes are removed, and a sub-partition address (a second file path) corresponding to the second sub-partition name in the list 2.

S541: Read data in the first file path.

S542: Overwrite the read data into the second file path.

S550: Determine whether there is still a sub-partition that has not been selected in the list 1.

If there is a sub-partition that has not been selected in the list 1, step S530 is performed to reselect a first sub-partition.

If there is no sub-partition that has not been selected in the list 1, static partition synchronization ends.

Table 1 and Table 2 are used as examples. In an application scenario, the device performs the following procedure:

The $1^{st}$ sub-partition whose selected state is 0 in Table 1 (the sub-partition bootloader_b with a number 1) is selected, and the selected state of the number 1 is changed to 1.

Suffix-removed matching is performed in all sub-partition names in Table 2 by using bootloader_b. Because bootloader_a is consistent with bootloader_b after_a and_b are removed, bootloader_a (the second sub-partition) is obtained through matching according to bootloader_b.

A file path/dev/block/by-name/bootloader_b (the first file path) corresponding to bootloader_b is read from Table 1.

A file path/dev/block/by-name/bootloader_a (the second file path) corresponding to bootloader_a is read from Table 2.

Data in/dev/block/by-name/bootloader_b is read, and the read data is overwritten into/dev/block/by-name/bootloader_a.

There is still a sub-partition whose selected state is 0 in Table 1. The 1st sub-partition whose selected state is 0 in Table 1 (the sub-partition boot_b with a number 2) is selected, and the selected state of the number 2 is changed to 1.

Suffix-removed matching is performed in all sub-partition names in Table 2 by using boot_b. Because boot_a is consistent with boot_b after_a and_b are removed, boot_a is obtained through matching according to boot_b.

A file path/dev/block/by-name/boot_b corresponding to boot_b is read from Table 1.

A file path/dev/block/by-name/boot_a corresponding to boot_a is read from Table 2.

Data in/dev/block/by-name/boot_b is read, and the read data is overwritten into /dev/block/by-name/boot_a.

There is still a sub-partition whose selected state is 0 in Table 1. The 1st sub-partition whose selected state is 0 in Table 1 (the sub-partition vendor_boot_b with a number 3) is selected, and the selected state of the number 3 is changed to 1.

Suffix-removed matching is performed in all sub-partition names in Table 2 by using vendor_boot_b. Because vendor_boot_a is consistent with vendor_boot_b after_a and_b are removed, vendor_boot_a is obtained through matching according to vendor_boot_b.

A file path/dev/block/by-name/vendor_boot_b corresponding to vendor_boot_b is read from Table 1.

A file path/dev/block/by-name/vendor_boot_a corresponding to vendor_boot_a is read from Table 2.

Data in/dev/block/by-name/vendor_boot_b is read, and the read data is overwritten into/dev/block/by-name/vendor_boot_a.

There is still a sub-partition whose selected state is 0 in Table 1. The 1st sub-partition whose selected state is 0 in Table 1 (the sub-partition dtbo_b with a number 4) is selected, and the selected state of the number 4 is changed to 1.

Suffix-removed matching is performed in all sub-partition names in Table 2 by using dtbo_b. Because dtbo_a is consistent with dtbo_b after_a and_b are removed, dtbo_a is obtained through matching according to dtbo_b.

A file path/dev/block/by-name/dtbo_b corresponding to dtbo_b is read from Table 1.

A file path/dev/block/by-name/dtbo_a corresponding to vendor_boot_a is read from Table 2.

Data in/dev/block/by-name/dtbo_b is read, and the read data is overwritten into /dev/block/by-name/dtbo_a.

There is still a sub-partition whose selected state is 0 in Table 1. The 1st sub-partition whose selected state is 0 in Table 1 (the sub-partition vbmeta_b with a number 5) is selected, and the selected state of the number 5 is changed to 1.

Suffix-removed matching is performed in all sub-partition names in Table 2 by using vbmeta_b. Because vbmeta_a is consistent with vbmeta_b after_a and_b are removed, vbmeta_a is obtained through matching according to vbmeta_b.

A file path/dev/block/by-name/vbmeta_b corresponding to vbmeta_b is read from Table 1.

A file path/dev/block/by-name/vbmeta_a corresponding to vendor_boot_a is read from Table 2.

Data in/dev/block/by-name/vbmeta_b is read, and the read data is overwritten into /dev/block/by-name/vbmeta_a.

There is no sub-partition whose selected state is 0 in Table 1, and static partition synchronization is completed.

Further, in the foregoing solution, Table 1 and Table 2 are transition data, and Table 1 and Table 2 are deleted after static partition synchronization is completed.

In a possible implementation, in an operating system upgrade process, in S320, when a read/write operation is performed on the data in the static partition (B) based on the operating system upgrade installation package, not all sub-partitions in the static partition (B) may be rewritten. To be specific, if the data in the static partition (A) and the data in the static partition (B) are completely consistent before operating system upgrade, after the operating system is upgraded according to the procedure shown in FIG. 3A and FIG. 3B, data in some sub-partitions in the static partition (A) and the static partition (B) may still be consistent. Therefore, in a process of synchronizing the data in the static partition (B) to the static partition (A), if sub-partitions with inconsistent data in the static partition (B) and the static partition (A) are first identified, and only the sub-partitions with inconsistent data are synchronized, a data read/write amount can be greatly reduced while implementing data consistency.

Figure 6A:
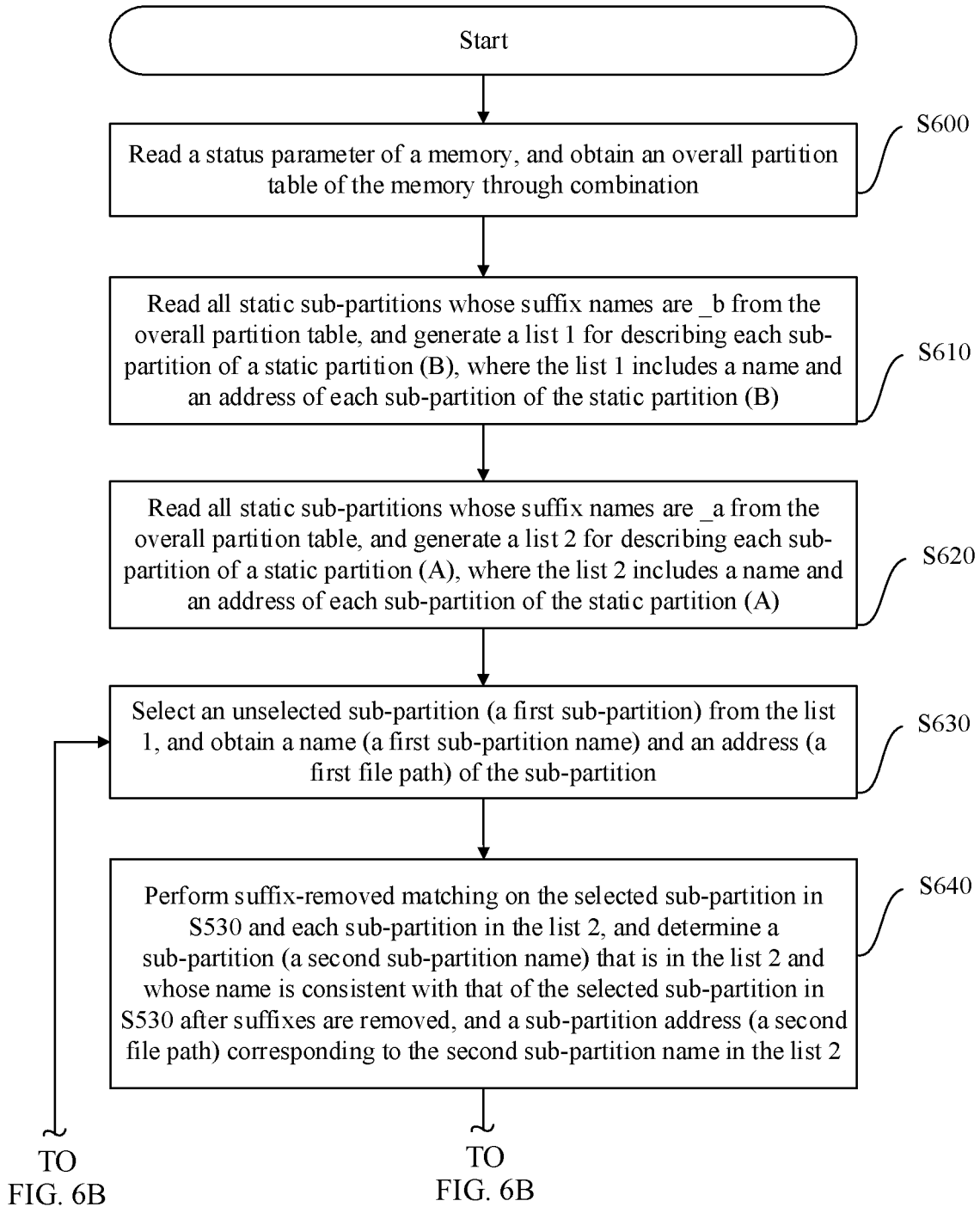
FIG. 6A and FIG. 6B are a flowchart of static partition synchronization according to an embodiment of this application.
Figure 6B:
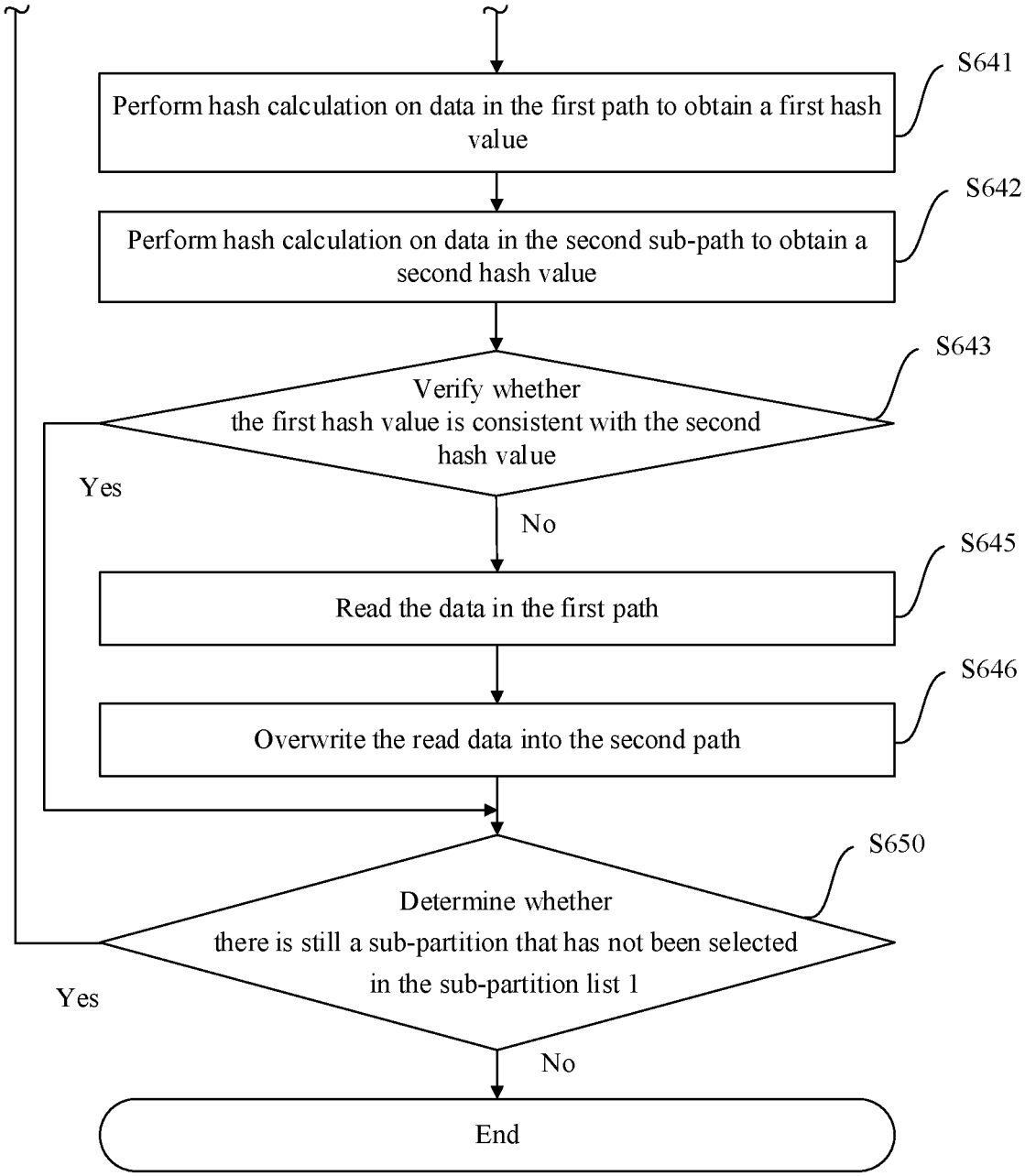

FIG. 6A and FIG. 6B are a flowchart of an implementation of S360. The terminal device performs the following procedure shown in FIG. 6A and FIG. 6B to implement S360.

For S610 to S640, refer to S510 to S540.

S641: Perform hash calculation on the data in the first path to obtain a first hash value. For example, hash calculation is performed on data in/dev/block/by-name/boot_b, and boot_b is a sub-partition (a third sub-partition) of the static partition (B).

S642: Perform hash calculation on the data in the second sub-path to obtain a second hash value. For example, hash calculation is performed on data in/dev/block/by-name/boot_a, and boot_a is a sub-partition (a fourth sub-partition) of the static partition (A).

S643: Verify whether the first hash value is consistent with the second hash value.

If the first hash value is consistent with the second hash value, S650 is performed.

If the first hash value is inconsistent with the second hash value, S645 is performed: Read the data in the first path.

S646: Overwrite the read data into the second path.

For S650, refer to S550.

If there is a sub-partition that has not been selected in the list 1, step S630 is performed to reselect a first sub-partition.

If there is no sub-partition that has not been selected in the list 1, static partition synchronization ends.

Further, in the solution of this application, after an execution node that performs data synchronization between the static partition (A) and the static partition (B) writes upgrade data into either of the static partition (A) and the static partition (B), an execution time node of S360 is not limited to being after S350.

Specifically, after S320, the upgrade data is written into the static partition (B). However, in this case, because the static partition (A) is loaded to run the operating system, the data in the static partition (B) cannot be synchronized to the static partition (A). After S331, in an execution process of S340, the device loads the static partition (B) to run the operating system, and running of the operating system does not require loading of the static partition (A). In this case, the data in the static partition (B) can be synchronized to the static partition (A). Therefore, in this embodiment of this application, S360 may be performed at any moment after S332. This application sets no specific limitation on an execution time sequence of S360. A person skilled in the art may set, according to an actual requirement, a static partition synchronization moment or a trigger condition for triggering static partition synchronization. The following describes another execution time sequence of S360 by using a specific embodiment as an example.

Figure 7A:
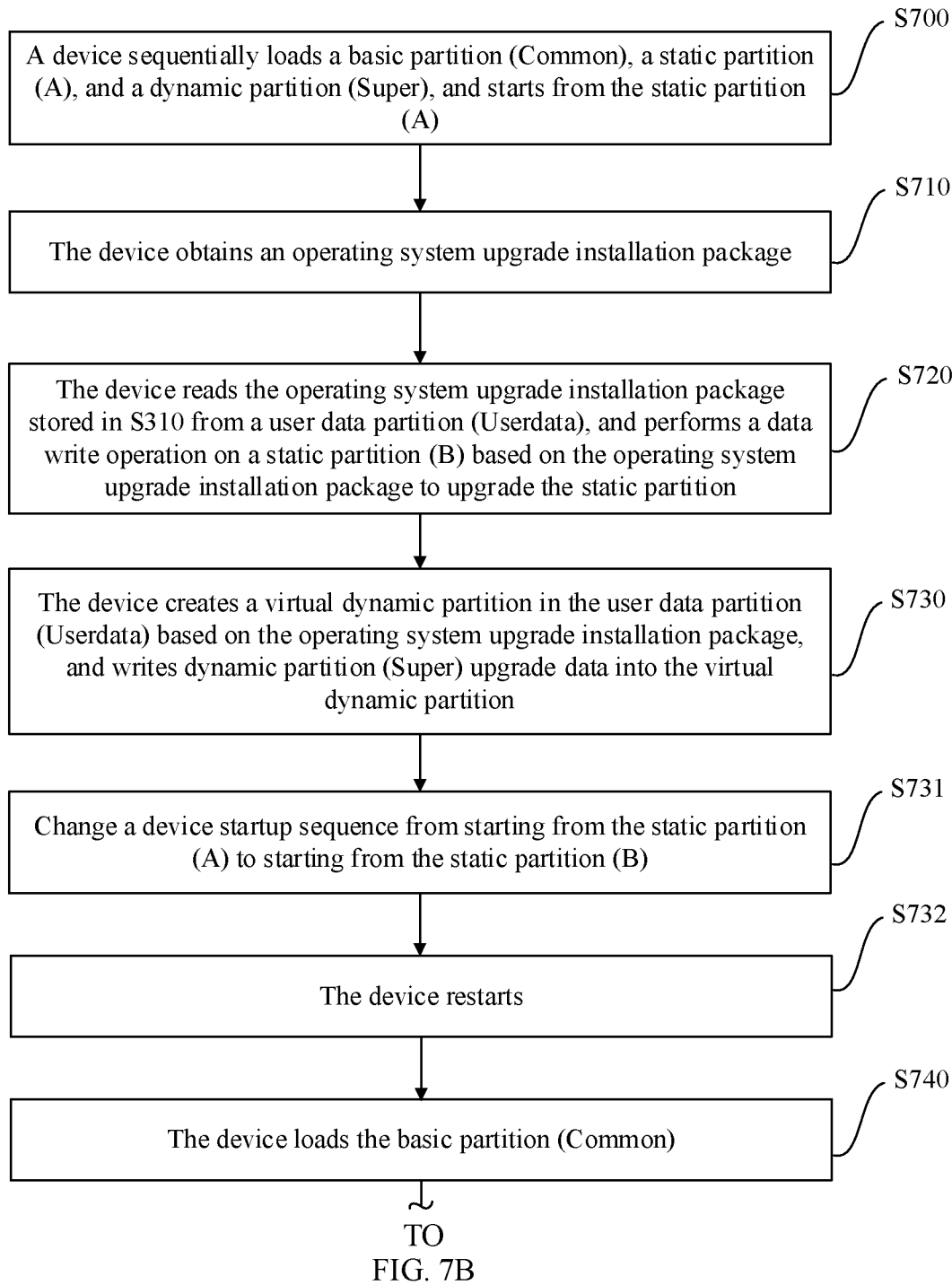
FIG. 7A and FIG. 7B are a flowchart of operating system upgrade according to an embodiment of this application.
Figure 7B:
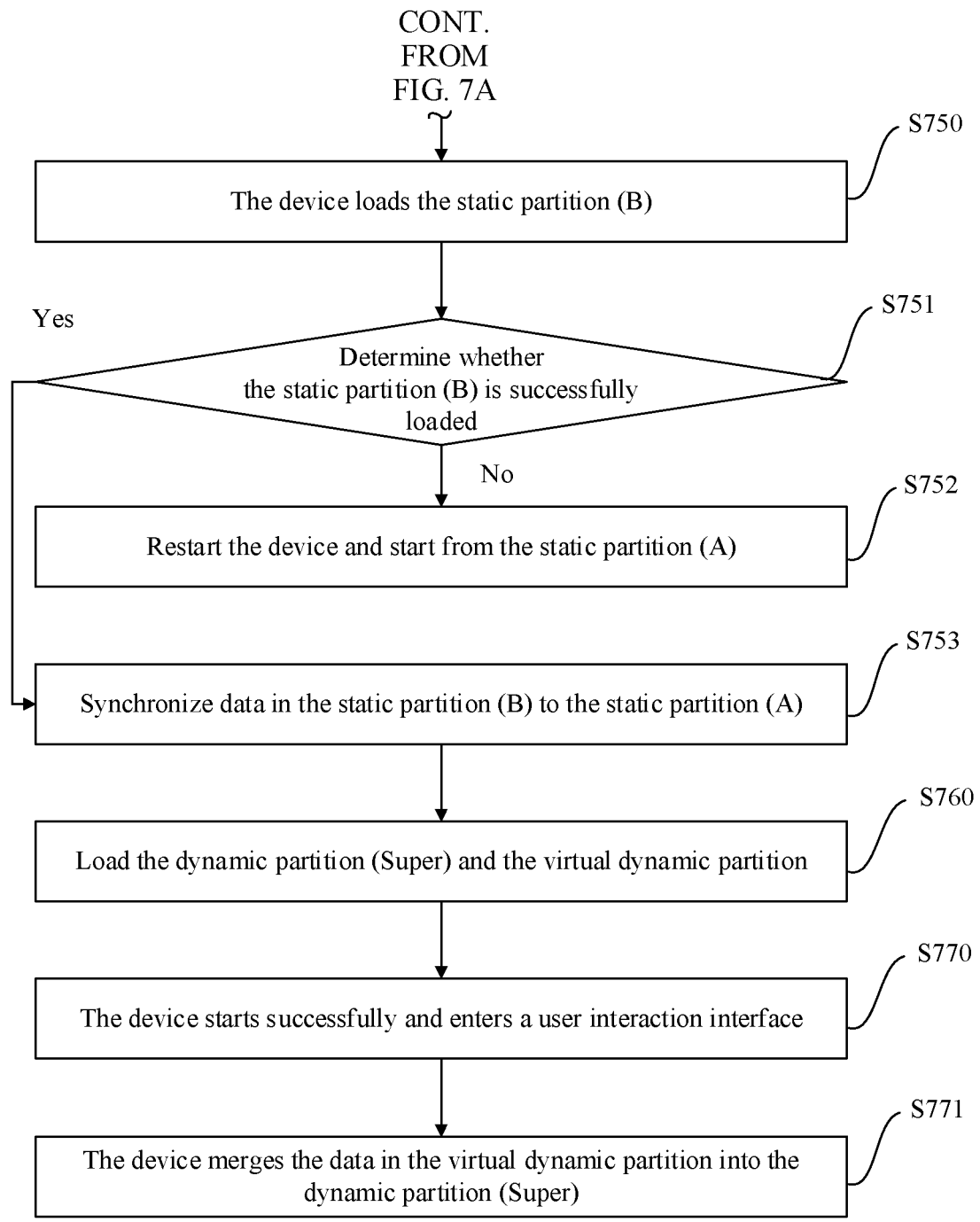

FIG. 7A and FIG. 7B are a flowchart of operating system upgrade according to an embodiment of this application. When the device currently starts from the static partition (A), the device upgrades the operating system and synchronizes the static partition according to a procedure shown in FIG. 7A and FIG. 7B.

For S700 to S731, refer to S300 to S331.

S740: The device loads the basic partition (Common).

S750: The device loads the static partition (B).

S751: Determine whether the static partition (B) is successfully loaded.

If the static partition (B) fails to be loaded, S752 is performed: Restart the device and start from the static partition (A).

If the static partition (B) is successfully loaded, S753 is performed: Synchronize the data in the static partition (B) to the static partition (A). For execution of S753, refer to S360.

S760: Load the dynamic partition (Super) and the virtual dynamic partition. For details, refer to S341.

S770: The device starts successfully and enters a user interaction interface. For details, refer to S350.

S771: The device merges the data in the virtual dynamic partition into the dynamic partition (Super). For details, refer to S351.

In the virtual A/B upgrade solution, after the device restarts and starts from the upgraded static partition, the device verifies a file that needs to be loaded for current system running in the dynamic partition and the virtual dynamic partition, and loads the file that needs to be loaded for current system running in the dynamic partition and the virtual dynamic partition only after the verification succeeds. If the verification fails, the device restarts and rolls back the system. In this case, the system upgrade fails.

Therefore, to avoid performing static partition synchronization when the upgrade fails, in an embodiment of this application, static partition synchronization is performed only after the file that needs to be loaded in the dynamic partition and the virtual dynamic partition is successfully verified or the file that needs to be loaded in the dynamic partition and the virtual dynamic partition is successfully loaded.

Figure 8A:
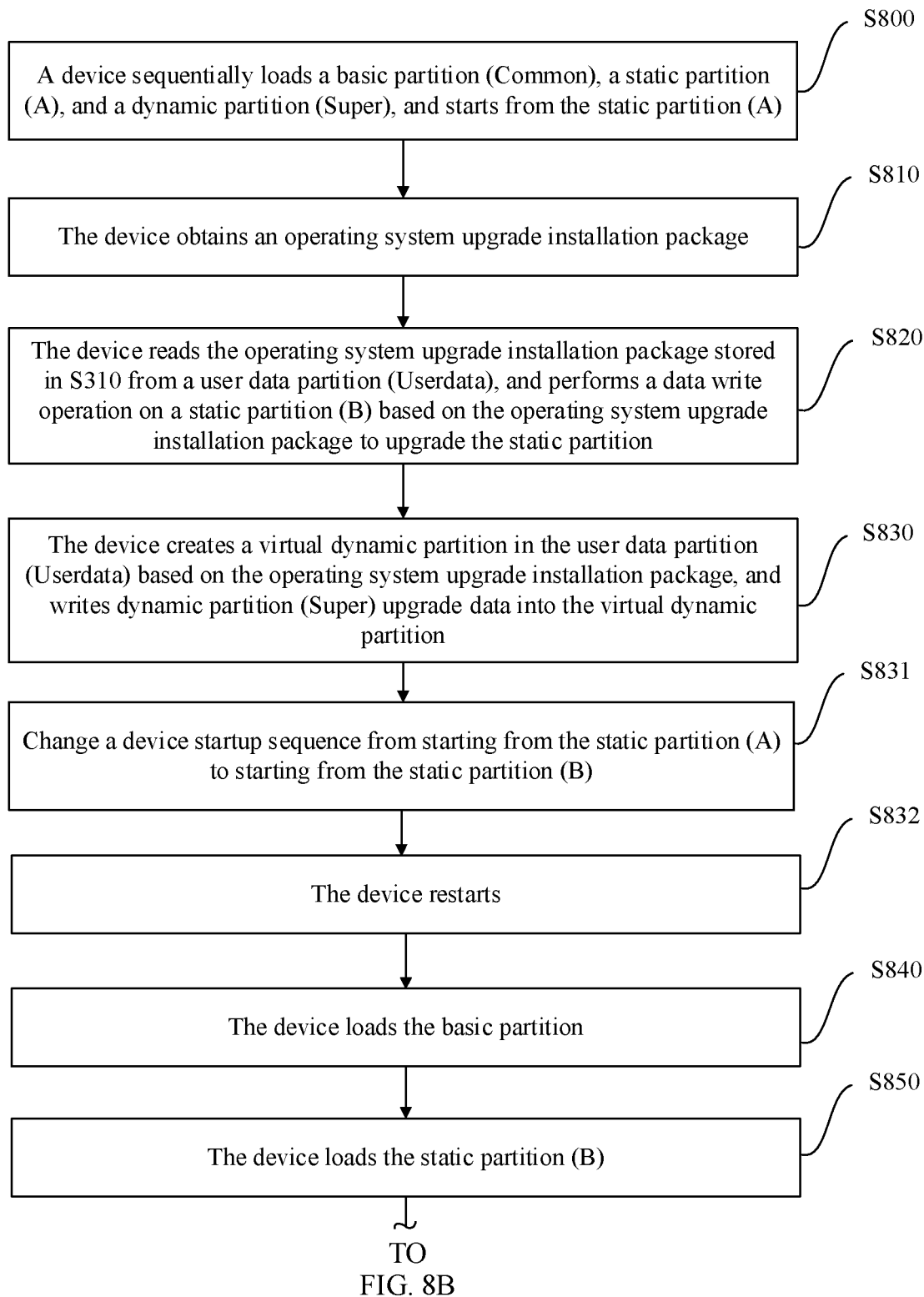
FIG. 8A and FIG. 8B are a flowchart of operating system upgrade according to an embodiment of this application.
Figure 8B:
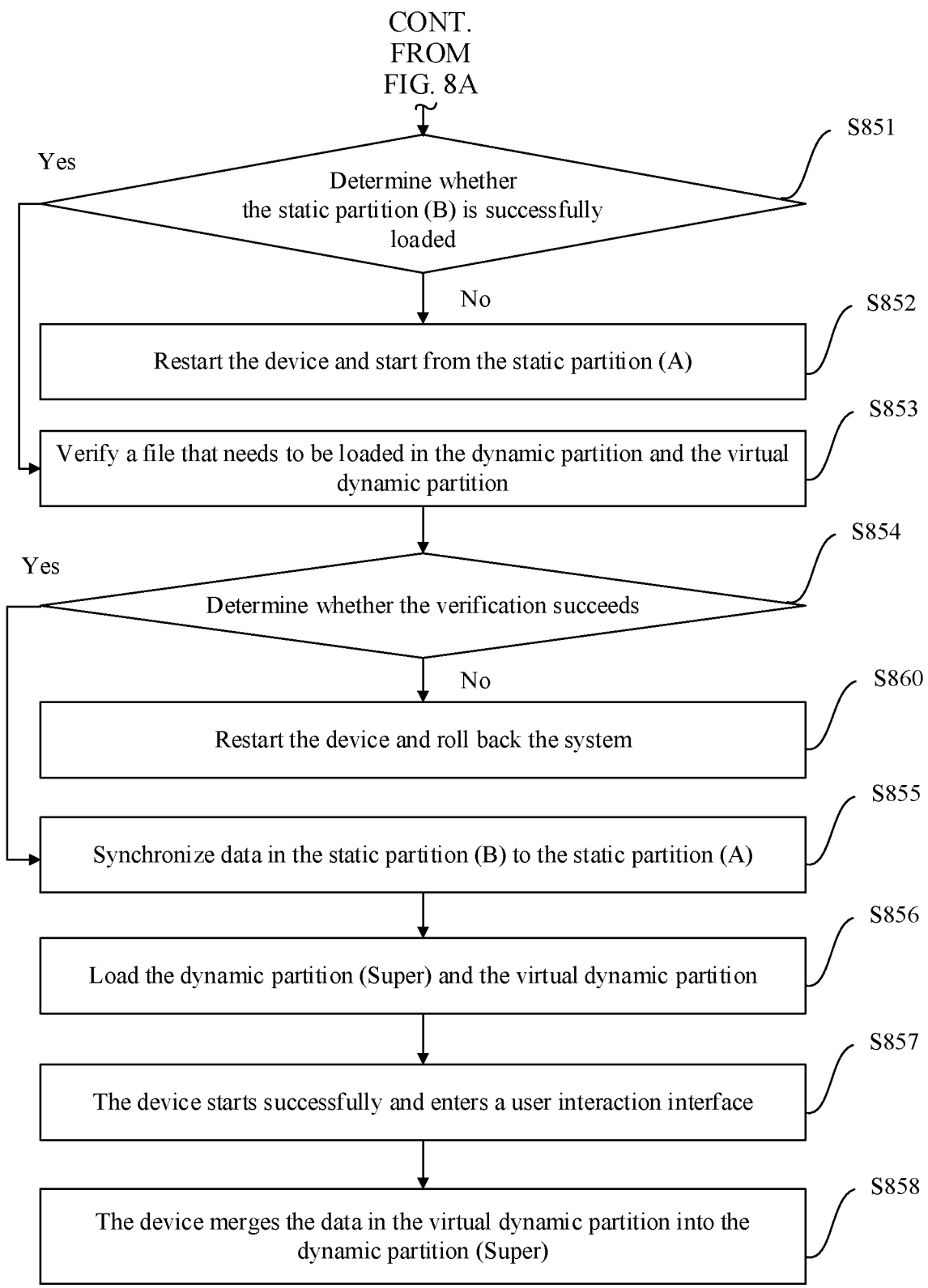

FIG. 8A and FIG. 8B are a flowchart of operating system upgrade according to an embodiment of this application. When the device currently starts from the static partition (A), the device upgrades the operating system and synchronizes the static partition according to a procedure shown in FIG. 8A and FIG. 8B.

For S800 to S852, refer to S700 to S752.

If the static partition (B) is successfully loaded, S853 is performed: Verify the file that needs to be loaded in the dynamic partition and the virtual dynamic partition. For example, dmverity is used.

S854: Determine whether the verification succeeds.

If the verification fails, S860 is performed: Restart the device and roll back the system, for example, start from the static partition (A).

If the verification succeeds, S855 is performed.

S855: Synchronize the data in the static partition (B) to the static partition (A). For execution of S853, refer to S360.

For S856 to S858, refer to S760 to S771.

It may be understood that some or all steps or operations in the foregoing embodiments are merely examples. In embodiments of this application, another operation or various operation variants may further be performed. In addition, the steps may be performed in a sequence different from that presented in the foregoing embodiments, and it is possible that not all operations in the foregoing embodiments are necessarily performed.

Further, usually, whether improvement to a technology is hardware improvement (for example, improvement to a circuit structure such as a diode, a transistor, or a switch) or software improvement (improvement to a method procedure) can be clearly identified. However, with development of technologies, improvement to many existing method procedures can be considered as direct improvement to hardware circuit structures. Almost all designers obtain a corresponding hardware circuit structure by programming an improved method procedure into a hardware circuit. Therefore, improvement to a method procedure can be implemented by using a hardware entity module. For example, a programmable logic device (Programmable Logic Device, PLD) (for example, a field programmable gate array (Field Programmable Gate Array, FPGA)) is such an integrated circuit, and a logical function of the programmable logic device is determined by programming a component by an access party. A designer autonomously performs programming to "integrate" a digital apparatus onto a PLD, without requesting a chip manufacturer to design and manufacture a dedicated integrated circuit chip. In addition, currently, instead of manually producing an integrated circuit chip, such programming is usually implemented by using "logic compiler (logic compiler)" software, which is similar to a software compiler used during program development and writing. Original code to be compiled needs to be written in a specific programming language, which is referred to as a hardware description language (Hardware Description Language, HDL). There is not only one HDL, but there are many HDLs such as ABEL (Advanced Boolean Expression Language), AHDL (Altera Hardware Description Language), Confluence, CUPL (Cornell University Programming Language), HDCal, JHDL (Java Hardware Description Language), Lava, Lola, MyHDL, PALASM, and RHDL (Ruby Hardware Description Language). Currently, VHDL (Very-High-Speed Integrated Circuit Hardware Description Language) and Verilog are most commonly used. It should also be clear to a person skilled in the art that a hardware circuit for implementing a logical method procedure can be easily obtained by performing slight logic programming on the method procedure by using the foregoing several hardware description languages and programming the method procedure into an integrated circuit.

Therefore, the method procedure provided in embodiments of this application may be implemented in a hardware manner. For example, a controller is used, and the controller controls a touchscreen to implement the method procedure provided in embodiments of this application.

The controller may be implemented in any suitable manner. For example, the controller may be in a form of a microprocessor or a processor and a computer-readable medium storing computer-readable program code (for example, software or firmware) that can be executed by the (micro) processor, a logic gate, a switch, an application-specific integrated circuit (Application-Specific Integrated Circuit, ASIC), a programmable logic controller, and an embedded microcontroller. Examples of the controller include but are not limited to the following microcontrollers: ARC 625D, Atmel AT91SAM, Microchip PIC18F26K20, and Silicone Labs C8051F320. A memory controller may further be implemented as a part of control logic of a memory. A person skilled in the art also knows that, in addition to implementing the controller by using only computer-readable program code, logic programming may be performed on a method step, so that the controller implements a same function in a form of a logic gate, a switch, an application-specific integrated circuit, a programmable logic controller, an embedded microcontroller, and the like. Therefore, the controller may be considered as a hardware component, and an apparatus that is included in the controller and that is configured to implement various functions may also be considered as a structure in the hardware component. Alternatively, an apparatus for implementing various functions may be considered as a software module that can implement a method or a structure in the hardware component.

Corresponding to the foregoing embodiment, this application further provides an electronic device. The electronic device includes a memory configured to store computer program instructions and a processor configured to execute the program instructions. When the computer program instructions are executed by the processor, the electronic device is triggered to perform the method steps described in embodiments of this application.

This application further provides a computer program product. The computer program product includes a computer program. When the computer program product runs on a computer, the computer is enabled to perform some or all steps provided in embodiments of this application.

A person skilled in the art may clearly understand that the technology in embodiments of the present invention may be implemented by using software and a necessary universal hardware platform. Based on such an understanding, the technical solutions in embodiments of the present invention essentially or the part contributing to the conventional technology may be implemented in a form of a software product. The computer software product may be stored in a storage medium, such as a ROM/RAM, a magnetic disk, or an optical disc, and includes several instructions for instructing a computer device (which may be a personal computer, a server, or a network device) to perform the method described in embodiments of the present invention or some parts of the embodiments.

For a same or similar part between the embodiments in this specification, mutual reference may be made to the embodiments. In particular, for the apparatus embodiment and the terminal embodiment, because the apparatus embodiment and the terminal embodiment are basically similar to the method embodiment, descriptions are relatively simple. For related parts, refer to the descriptions in the method embodiment.

What is claimed is:

1. A method, applied to an electronic device, wherein the electronic device comprises a processor and a memory, the memory comprises a basic partition, a first static partition, a second static partition, a dynamic partition, and a user data partition, and wherein the method comprises:
   loading data in the basic partition, the first static partition, and the dynamic partition to run a first operating system;
   obtaining an upgrade installation package, wherein the upgrade installation package comprises first data and second data;
   creating a virtual dynamic partition in the user data partition, and storing the first data in the virtual dynamic partition;
   writing the second data into the second static partition;
   restarting the electronic device, and determining that a current startup sequence is starting from the second static partition;
   loading third data in the basic partition;
   loading fourth data in the second static partition, wherein the fourth data comprises the second data;
   loading fifth data in the dynamic partition, and loading the first data;
   merging the first data in the user data partition into the dynamic partition; and
   after the restarting the electronic device, and the determining that the current startup sequence is starting from the second static partition, synchronizing the fourth data in the second static partition to the first static partition.

2. The method according to claim 1, wherein the synchronizing the fourth data in the second static partition to the first static partition comprises:
   reading corresponding data in each sub-partition of the second static partition; and
   overwriting the corresponding data in each sub-partition of the second static partition into a corresponding sub-partition of the first static partition.

3. The method according to claim 1, wherein the synchronizing the fourth data in the second static partition to the first static partition comprises:
   calculating a first hash value of first corresponding data in a third sub-partition of the second static partition;
   calculating a second hash value of second corresponding data in a fourth sub-partition of the first static partition, wherein the fourth sub-partition corresponds to the third sub-partition; and
   overwriting the first corresponding data in the third sub-partition into the fourth sub-partition when the first hash value of the first corresponding data in the third sub-partition is inconsistent with the second hash value of the second corresponding data in the fourth sub-partition.

4. The method according to claim 1, wherein in a process of the loading the third data in the basic partition, the second static partition, and the dynamic partition to run a second operating system, the fourth data in the second static partition is synchronized to the first static partition after verification on the fourth data in the second static partition succeeds.

5. The method according to claim 1, wherein in a process of the loading the third data in the basic partition, the second static partition, and the dynamic partition to run a second operating system, the fourth data in the second static partition is synchronized to the first static partition after verification on a to-be-loaded dynamic partition file succeeds.

6. The method according to claim 1, wherein the fourth data in the second static partition is synchronized to the first static partition after the first data is merged into the dynamic partition.

7. The method according to claim 6, wherein the creating the virtual dynamic partition in the user data partition, and storing the first data in the virtual dynamic partition comprise:
   storing the first data in the user data partition in a form of a copy-on-write (COW file), and wherein the loading the fifth data in the dynamic partition and the first data comprises:
   loading, based on a snapshot technology, a file that needs to be loaded in the COW file of the first data and the dynamic partition.

8. The method according to claim 6, wherein the merging the first data into the dynamic partition comprises:
   overwriting the first data into a to-be-upgraded file corresponding to the first update data in the dynamic partition; and
   deleting the first data in the user data partition.

9. The method according to claim 1, wherein the first data comprises the fifth data of the dynamic partition, upgrade data of the dynamic partition, or update data of the dynamic partition.

10. The method according to claim 1, wherein the second data comprises the fourth data of the second static partition, upgrade data of the second static partition, or update data of the second static partition.

11. An electronic device, comprising
one or more processors; and
one or more memories, the one or more memories comprise a basic partition, a first static partition, a second static partition, a dynamic partition, and a user data partition, the dynamic partition comprises a plurality of sub-partitions;
wherein the one or more memories store one or more programs, and when the one or more programs are executed, the electronic device is caused to perform:
loading data in the basic partition, the first static partition, and the dynamic partition to run a first operating system;
obtaining an upgrade installation package, wherein the upgrade installation package comprises first data and second data;
creating a virtual dynamic partition in the user data partition, and storing the first data in the virtual dynamic partition;
writing the second data into the second static partition;
restarting the electronic device, and determining that a current startup sequence is starting from the second static partition;
loading third data in the basic partition;
loading fourth data in the second static partition;
loading fifth data in the dynamic partition, and load the first data;
merging the first data in the user data partition into the dynamic partition; and
after the restarting the electronic device, and the determining that the current startup sequence is starting from the second static partition, synchronizing the fourth data in the second static partition to the first static partition.

12. The electronic device according to claim 11, wherein, when the one or more programs are executed, the electronic device is further caused to perform:
reading corresponding data in each sub-partition of the second static partition; and
overwriting the corresponding data in each sub-partition of the second static partition into a corresponding sub-partition of the first static partition.

13. The electronic device according to claim 11, wherein, when the one or more programs are executed, the electronic device is further caused to perform:
calculating a first hash value of first corresponding data in a third sub-partition of the second static partition;
calculating a second hash value of second corresponding data in a fourth sub-partition of the first static partition, wherein the fourth sub-partition corresponds to the third sub-partition; and
overwriting the first corresponding data in the third sub-partition into the fourth sub-partition when the first hash value of the first corresponding data in the third sub-partition is inconsistent with the second hash value of the second corresponding data in the fourth sub-partition.

14. The electronic device according to claim 11, wherein in a process of the loading the third data in the basic partition, the second static partition, and the dynamic partition to run a second operating system, the fourth data in the second static partition is synchronized to the first static partition after verification on the fourth data in the second static partition succeeds.

15. The electronic device according to claim 11, wherein in a process of the loading the third data in the basic partition, the second static partition, and the dynamic partition to run a second operating system, the fourth data in the second static partition is synchronized to the first static partition after verification on a to-be-loaded dynamic partition file succeeds.

16. The electronic device according to claim 11, wherein the fourth data in the second static partition is synchronized to the first static partition after the first data is merged into the dynamic partition.

17. The electronic device according to claim 16, wherein the creating the virtual dynamic partition in the user data partition, and the storing the first data in the virtual dynamic partition comprise:
storing the first data in the user data partition in a form of a copy-on-write (COW) file, and wherein the loading the fifth data in the dynamic partition and the first data comprises:
loading, based on a snapshot technology, a file that needs to be loaded in the COW file of the first data and the dynamic partition.

18. The electronic device according to claim 16, wherein the merging the first data into the dynamic partition comprises:
overwriting the first data into a to-be-upgraded file corresponding to the first data in the dynamic partition; and
deleting the first data in the user data partition.

19. The electronic device according to claim 11,
wherein the first data comprises the fifth data of the dynamic partition, upgrade data of the dynamic partition, or update data of the dynamic partition, and
wherein the second data comprises the fourth data of the second static partition, upgrade data of the second static partition, or update data of the second static partition.

20. A non-transitory computer-readable storage medium, wherein the non-transitory computer-readable storage medium stores a computer program, and when the computer program is run on an electronic device, the electronic device is enabled to perform operations including:
loading data in a basic partition, a first static partition, and a dynamic partition to run a first operating system;
obtaining an upgrade installation package, wherein the upgrade installation package comprises first data and second data;
creating a virtual dynamic partition in a user data partition, and storing the first data in the virtual dynamic partition;
writing the second data into a second static partition;
restarting the electronic device, and determining that a current startup sequence is starting from the second static partition;
loading third data in the basic partition;
loading fourth data in the second static partition;
loading fifth data in the dynamic partition, and loading the first data;
merging the first data in the user data partition into the dynamic partition; and
after the restarting the electronic device, and the determining that the current startup sequence is starting from the second static partition, synchronizing the fourth data in the second static partition to the first static partition.

* * * * *

UNITED STATES PATENT AND TRADEMARK OFFICE
CERTIFICATE OF CORRECTION

| | | |
|---|---|---|
| PATENT NO. | : 12,093,678 B2 | Page 1 of 1 |
| APPLICATION NO. | : 17/921782 | |
| DATED | : September 17, 2024 | |
| INVENTOR(S) | : Chen et al. | |

It is certified that error appears in the above-identified patent and that said Letters Patent is hereby corrected as shown below:

In the Claims

In Column 22, in Claim 8, Line 65, after "first" delete "update".

Signed and Sealed this
Twenty-second Day of October, 2024

*Katherine Kelly Vidal*

Katherine Kelly Vidal
*Director of the United States Patent and Trademark Office*